United States Patent
Kasahara et al.

(10) Patent No.: US 10,101,205 B2
(45) Date of Patent: Oct. 16, 2018

(54) MEASUREMENT DEVICE, ELECTRONIC APPARATUS, AND MEASUREMENT METHOD

(71) Applicant: Seiko Epson Corporation, Tokyo (JP)

(72) Inventors: Hideaki Kasahara, Matsumoto (JP); Masashi Kanai, Azumino (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/292,477

(22) Filed: Oct. 13, 2016

(65) Prior Publication Data
US 2017/0122807 A1    May 4, 2017

(30) Foreign Application Priority Data
Oct. 28, 2015   (JP) .................. 2015-212281

(51) Int. Cl.
G01B 9/02      (2006.01)
G01J 3/45      (2006.01)
G01J 3/26      (2006.01)
G01J 3/02      (2006.01)
G01J 3/28      (2006.01)

(52) U.S. Cl.
CPC ............ G01J 3/26 (2013.01); G01J 3/027 (2013.01); G01J 3/2823 (2013.01); G01J 3/45 (2013.01)

(58) Field of Classification Search
CPC .. G01J 3/027; G01J 3/26; G01J 3/2823; G01J 3/45
See application file for complete search history.

(56) References Cited

U.S. PATENT DOCUMENTS

| 8,860,950 B2 | 10/2014 | Urushidani | |
| 2002/0015151 A1* | 2/2002 | Gorin | G01J 3/2823 356/303 |
| 2008/0130009 A1* | 6/2008 | Wang | G01J 3/52 356/454 |
| 2012/0109584 A1 | 5/2012 | Urushidani | |
| 2013/0107260 A1* | 5/2013 | Nozawa | G01J 3/42 356/402 |
| 2014/0078503 A1* | 3/2014 | Matsushita | G02B 26/001 356/416 |
| 2017/0070648 A1* | 3/2017 | Tatsuda | H04N 1/6044 |

FOREIGN PATENT DOCUMENTS

JP       2012-093275 A       5/2012

* cited by examiner

*Primary Examiner* — Michael A Lyons
(74) *Attorney, Agent, or Firm* — Harness, Dickey & Pierce, P.L.C.

(57) ABSTRACT

A spectroscopic camera includes a wavelength variable interference filter, and an image sensor that receives light which is transmitted through the wavelength variable interference filter. Measurement is implemented a plurality of times by causing measurement light to be incident to the wavelength variable interference filter and changing the wavelength of light that is transmitted by the wavelength variable interference filter. Reflectance based on the intensity of light when a first pixel of the image sensor receives light of a target wavelength, is predicted in the respective plurality of repetitions of measurement on the basis of a light reception central wavelength of light that the first pixel receives, and reflectance that is calculated on the basis of the intensity of light that is received by the first pixel.

8 Claims, 13 Drawing Sheets

MEASUREMENT DEVICE, ELECTRONIC APPARATUS, AND MEASUREMENT METHOD

BACKGROUND

1. Technical Field

The present invention relates to a measurement device, an electronic apparatus, and a measurement method that measures light of incidence light.

2. Related Art

In the related art, measurement devices that perform spectroscopic measurement of a measurement subject, acquire spectroscopic images, and the like, by causing light that is dispersed by a spectroscopic element to be received by a light reception section, is known.

It is preferable to use an element that collectively disperses (referred to as surface dispersal from this point onwards) light that is incident to a predetermined region as this kind of spectroscopic element, and for example, it is possible to use a Fabry-Perot etalon element, a liquid crystal tunable filter (LCTF), or the like. In particular, in a case of a Fabry-Perot etalon element (an interference filter) in which a pair of reflective films are disposed facing one another, both a low price and miniaturization are possible, and therefore, it is possible to easily apply such an element to a compact measurement device.

Incidentally, in this kind of spectroscopic element, there are cases in which a dispersed wavelength is altered depending on an incidence position of incidence light. For example, in an interference filter in which a pair of reflective films are disposed facing one another, if there is warping or inclination in a reflective film, a distance between the reflective films changes depending on the incidence position of incidence light, in-plane wavelength variations occur when the light is surface dispersed, and therefore, it is not possible to acquire a spectroscopic image having high accuracy. In such an instance, a configuration that is capable of accurately understanding the in-plane spectroscopic wavelength distribution when light is surface dispersed in an interference filter, has been devised (for example, refer to JP-A-2012-93275).

A measurement device that is disclosed in JP-A-2012-93275 is provided with a wavelength variable interference filter that is provided with a pair of reflective films, and a gap alteration section (an electrostatic actuator), which alters a gap dimension between the pair of reflective films, and a detection section that receives light that is transmitted by the wavelength variable interference filter.

In the measurement device, light from a measurement subject is caused to be incident to the measurement device, and a measurement process of light, which measures the light intensity that is received by each pixel (detection element) of the detection section, is implemented a plurality of times by altering a voltage that is applied to the gap alteration section a plurality of times. In addition, correlation data, which is related to the wavelengths of light that can be received by each pixel, is stored in advance for each voltage that is applied to the gap alteration section, and the wavelength of the light that is received by each pixel in each measurement repetition is specified on the basis of the correlation data.

It is possible to acquire the light intensity with respect to a target wavelength in each pixel by using this kind of measurement device, and therefore, it is possible to suppress in-plane wavelength variations.

However, in the measurement device that is disclosed in JP-A-2012-93275 mentioned above, it is necessary to switch a gap dimension between a pair of reflective films a plurality of times in order for light of a target wavelength to be received by each pixel of the detection section. In this case, unlike normal spectroscopic measurement, which performs a wavelength scan by switching the wavelength in 20 nm intervals, for example, it is necessary to implement more measurements. Accordingly, there is a technical problem in that the duration of a measurement time in order to measure a spectroscopic image of a target wavelength, is long.

SUMMARY

An advantage of some aspects of the invention is to provide a measurement device, an electronic apparatus, and a measurement method that suppress in-plane wavelength variations and in which rapid measurement is possible.

According to this application example, there is provided a measurement device including a spectroscopic element that disperses light of a predetermined wavelength among incidence light, and that is capable of changing a wavelength of light that is dispersed, and an image capturing element that receives light that is dispersed by the spectroscopic element, and includes a plurality of pixels, in which measurement is implemented a plurality of times by causing measurement light to be incident to the spectroscopic element and changing the wavelength of light that is dispersed by the spectroscopic element, and an optical association value when a first pixel, among the plurality of pixels in the respective plurality of repetitions of measurement, receives light of a first wavelength, is predicted on the basis of a light reception central wavelength of light that the first pixel receives, and the optical association value based on light of the light reception central wavelength that is received by the first pixel.

In this instance, the term optical association value in the invention may be the intensity (a light quantity value) of light that is received by each pixel of the image capturing element, or may be the reflectance, the absorbance, or the like, that is calculated on the basis of the intensity of light.

In the measurement device according to the application example, measurement, which, using the image capturing element, receives light that is dispersed by causing incidence light to be incident to the spectroscopic element, is implemented a plurality of times while changing the wavelength that is dispersed by the spectroscopic element. As a result of this, an optical association value of light that the first pixel receives is acquired in the respective plurality of repetitions of measurement. Further, the measurement device predicts an optical association value of a first wavelength (a wavelength which is set as a target) from a combination of a light reception central wavelength of light that the first pixel receives when the association value that corresponds to the light reception central wavelength.

In this kind of measurement device, since the optical association value of the light of the first wavelength that is incident to the first pixel is predicted on the basis of the measurement results that are obtained by the plurality of repetitions of measurement, it is possible to shorten the time for measurement. In addition, since the optical association value is predicted for a target wavelength that is received by the first pixel, measurement is performed with higher accuracy than a case in which the optical association value based on light that is received by the first pixel is set as the optical association value for a target wavelength, for example.

In other words, in a case in which the measurement device that is disclosed in JP-A-2012-93275 mentioned above is used, it is necessary to switch the spectroscopic wavelength of the spectroscopic element so that the first pixel receives light of the first wavelength. Accordingly, for example, in a case in which it is desirable to acquire a spectroscopic image of the first wavelength, after controlling the spectroscopic element so that light of the first wavelength is received by a certain pixel, it is necessary to control the spectroscopic element again so that light of the first wavelength is received in another pixel, and thereafter to repeat the same control for each pixel of the image capturing element. Therefore, the duration of the measurement time is long. In addition, it is necessary to control the spectroscopic element with high accuracy so that the first pixel receives light of the first wavelength, and therefore, the control configuration is increased in complexity.

In contrast to this, according to the application example, for example, it is not necessary to control the spectroscopic element so that light of the first wavelength is received in the first pixel. If normal measurement, which switches the spectroscopic wavelength in 20 nm intervals, for example, is implemented, it is possible to predict the light of the first wavelength that is received in the first pixel on the basis of the measurement results. In addition, in a case in which the spectroscopic element is controlled so that light of the first wavelength is received in the first pixel, a circuit configuration that controls the spectroscopic element with high accuracy, is required, but according to the application example, such a configuration is not required, and therefore, it is possible to achieve simplification of the configuration and a reduction in cost of the measurement device.

It is preferable that the measurement device according to the application example further includes a prediction unit that predicts the optical association value when the first pixel receives the first wavelength by interpolating a first optical association value, which corresponds to a first light reception central wavelength, and a second optical association value, which corresponds to a second light reception central wavelength, among the optical association values that are obtained in the respective plurality of measurements.

In this instance, the first optical association value that corresponds to the first light reception central wavelength is a measurement result of a predetermined measurement repetition in the plurality of repetitions of measurement, and the second optical association value that corresponds to the second light reception central wavelength is a measurement result of another measurement repetition in the plurality of repetitions.

In the measurement device according to the application example, the prediction unit predicts the optical association value that corresponds to the first wavelength by interpolating the first optical association value, which corresponds to the first light reception central wavelength, and the second optical association value, which corresponds to the second light reception central wavelength. Since the prediction unit predicts the optical association value that corresponds to the first wavelength using interpolation, it is possible to improve the measurement accuracy in comparison with a case of predicting using an extrapolation technique, for example.

In the measurement device according to the application example, it is preferable that the prediction unit predicts the optical association value when the first pixel receives the first wavelength using linear interpolation.

In the measurement device according to the application example, the prediction unit predicts the optical association value that corresponds to the first wavelength using linear interpolation. In this case, it is possible to simplify the operation relating to interpolation, and therefore, it is possible to achieve a reduction in the processing load and a decrease in the processing time relating to the operation.

In the measurement device according to the application example, it is preferable that the prediction unit predicts the optical association value when the first pixel receives the first wavelength using spline interpolation.

In the measurement device according to the application example, the prediction unit predicts the optical association value that corresponds to the first wavelength using spline interpolation. In linear interpolation, an amount of change at a measurement point (a plot point of optical association value with respect to light reception central wavelength) is increased in size. In addition, in linear interpolation, since a value on a line segment that links measurement points is calculated, for example, the error from practical optical association values is increased in size in a case in which the intervals between measurement points are large, and therefore, there are cases in which it is not possible to predict the optical association values with a sufficient amount of accuracy. In contrast to this, according to the application example, it is possible to calculate a polynomial approximation equation of a smooth curve that passes through each measurement point, and therefore, it is possible to predict the optical association values with high accuracy.

In the measurement device according to the application example, it is preferable that the prediction unit predicts the optical association value when the first pixel receives the first wavelength using piecewise hermite interpolation.

In the measurement device according to the application example, the optical association value that corresponds to the first wavelength is predicted using piecewise hermite interpolation. In a case in which spline interpolation is used, it is possible to approximate a spectroscopic spectrum using a smooth curve that passes through each measurement point. However, there are cases in which an unintended peak point is formed between two measurement points, and in this case, a curve that differs from a practical spectrum curve is formed.

In contrast to this, according to the application example, as a result of using piecewise hermite interpolation, unintended peak points such as those mentioned above are not formed, and it is possible to perform an interpolation process that links each measurement point with a smoothness of an intermediate extent between linear interpolation and spline interpolation, and therefore, it is possible to perform prediction of optical association values having high accuracy.

In the measurement device according to the application example, it is preferable that an order of light of the first wavelength that is dispersed by the spectroscopic element, and an order of the light reception central wavelength that is acquired in order to predict the optical association value of the light of the first wavelength, are the same.

In the measurement device according to the application example, the order (for example, the order when dispersing light of the first light reception central wavelength or the second light reception central wavelength using the spectroscopic element) of measurement results that are used in order to predict the optical association value that corresponds to the first wavelength is the same as the order when light of the first wavelength is dispersed.

That is, a different result is output if the order differs when light of a predetermined wavelength is dispersed by the spectroscopic element. For example, the intensity of dispersed light differs between a case in which light of a wavelength $\lambda$ is dispersed by the spectroscopic element using a second order, and a case in which light of the wavelength λ is dispersed by the spectroscopic element using a third order. Accordingly, when the optical association value of the light of the first wavelength is predicted on the basis of the intensity of light of a wavelength $\lambda_1$ that is dispersed by the spectroscopic element using the third order, and the intensity of light of a wavelength $\lambda_2$ that is dispersed by the spectroscopic element using the second order, for example, prediction of optical association values having high accuracy is not possible since the order that corresponds to a reference differs. In contrast to this, according to the application example, as a result of aligning the order when dispersing light of the wavelengths $\lambda_1$ and $\lambda_2$, which are used when predicting the optical association value of the first wavelength, using the spectroscopic element, and the order when the first wavelength is dispersed using the spectroscopic element, it is possible to achieve an improvement in the prediction accuracy of the optical association value for the first wavelength.

It is preferable that the measurement device according to the application example further includes a shift amount calculation unit that calculates a wavelength shift amount, which is a difference between a reference wavelength that is a central wavelength of light that is incident to a predetermined reference pixel, and a central wavelength of light that is incident to the first pixel on the basis of each image capture result when the images of a plurality of reference subjects are captured using the spectroscopic element and the image capturing element.

In the measurement device according to the application example, a shift amount calculation unit is provided, and a wavelength shift amount, which is a difference between a reference wavelength of light that is received in a reference pixel, and a central wavelength of light that is received in the first pixel, is calculated on the basis of image capture results of a plurality of reference subjects. Therefore, if the spectroscopic element is controlled so that the light of the first wavelength is received by the reference pixel, it is possible to easily calculate the light reception central wavelength of the light that is received by the first pixel. As a result of this, in the abovementioned manner, it is possible to predict the optical association value of the light of the first wavelength that is received by the first pixel on the basis of the light reception central wavelength that is received by the first pixel, and the optical association value thereof.

In the measurement device according to the application example, it is preferable that the reference subjects have known reflectances.

In the measurement device according to the application example, the reference subjects have known reflectances.

In this case, as a result of calculating a spectrum of the reflectances from the gradation values of the first pixel in the spectroscopic images of each wavelength, and comparing the spectrum with a known spectrum of reflectances, it is possible to easily calculate the wavelength shift amount of the light that is received by the first pixel.

In the measurement device according to the application example, it is preferable that the shift amount calculation unit calculates the wavelength shift amount on the basis of each image capture result when the images of a plurality of reference subjects having different reflectances, are captured.

In the measurement device according to the application example, the wavelength shift amount is calculated on the basis of image capture results of a plurality of reference subjects having respectively different reflectances. In this case, for example, it is possible to calculate a wavelength shift amount that is uniform for many types of reference subject with higher accuracy than a case in which a wavelength shift amount is calculated on the basis of an image capture result of a single type of reference subject, for example.

In the measurement device according to the application example, it is preferable that the shift amount calculation unit calculates the wavelength shift amount using a least squares technique.

In the measurement device according to the application example, the wavelength shift amount is calculated with a least squares technique using a plurality of samples that correspond to image capture results of a plurality of reference subjects. As a result of this, it is possible to calculate a wavelength shift amount having even higher accuracy using a simple operational expression.

In the measurement device according to the application example, it is preferable that the spectroscopic element is a Fabry-Perot etalon element.

In the measurement device according to the application example, a Fabry-Perot type etalon element is used as the spectroscopic element. This kind of Fabry-Perot etalon element (from this point onwards, there are cases of reference as a wavelength variable interference filter) has a simple configuration in which a pair of reflective films are disposed facing one another, and the element size thereof can be reduced.

Accordingly, as a result of applying this kind of spectroscopic element to the measurement device, it is possible to promote further miniaturization of the measurement device itself.

According to another application example, there is provided a measurement device including a spectroscopic element that disperses light of a predetermined wavelength among incidence light, and that is capable of changing a wavelength that is dispersed, and an image capturing element that receives light that is dispersed by the spectroscopic element, and includes a plurality of pixels, in which a wavelength shift amount, which is a difference between a reference wavelength that is a central wavelength of light that is incident to a predetermined reference pixel, and a central wavelength of light that is respectively incident to the plurality of pixels, is calculated on the basis of each image capture result when images of a plurality of reference subjects are captured using the spectroscopic element and the image capturing element.

In the measurement device according to the application example, a shift amount calculation unit calculates a wavelength shift amount, which is a difference between a reference wavelength of light that is received by a reference pixel, and a central wavelength of light that is received by each pixel, on the basis of image capture results of a plurality of reference subjects. Therefore, as a result of controlling the spectroscopic element so that the light of the reference wavelength is received by the reference pixel, it is possible to easily calculate the central wavelength of the light that is received by other pixels. Accordingly, as a result of correcting the optical association values based on the light that is received by each pixel, on the basis of a wavelength shift amount, it is possible to suppress in-plane wavelength variations in captured images, and rapid measurement is possible.

In the measurement device according to the application example, it is preferable that the reference subjects have known reflectances.

In the measurement device according to the application example, since the reference subjects have known reflectances, as a result of comparing the reflectances that are calculated from the gradation value of each pixel of a captured image, and the known reflectances, it is possible to easily calculate the wavelength shift amounts if the light that is received by each pixel.

In the measurement device according to the application example, it is preferable that the wavelength shift amount is calculated on the basis of each image capture result when the images of a plurality of reference subjects having different reflectances, are captured.

In the measurement device according to the application example, the wavelength shift amount is calculated on the basis of image capture results of a plurality of reference subjects having respectively different reflectances. In this case, for example, it is possible to calculate a wavelength shift amount that is uniform for many types of reference subject with higher accuracy than a case in which a wavelength shift amount is calculated on the basis of an image capture result of a single type of reference subject, for example.

In the measurement device according to the application example, it is preferable that the wavelength shift amount is calculated using a least squares technique.

In the measurement device according to the application example, the wavelength shift amount is calculated with a least squares technique using a plurality of samples that correspond to image capture results of a plurality of reference subjects. As a result of this, it is possible to calculate a wavelength shift amount having even higher accuracy using a simple operational expression.

It is preferable that the measurement device according to the application example further include a correction unit that corrects a spectroscopic image on the basis of the respective wavelength shift amounts in the plurality of pixels when the spectroscopic image of a first wavelength, which is dispersed by the spectroscopic element is captured by the image capturing element by causing measurement light to be incident to the spectroscopic element.

In the measurement device according to the application example, correction of a spectroscopic image based on a wavelength shift amount is performed using the correction unit. As a result of this, it is possible to acquire a spectroscopic image in which in-plane wavelength variation is suppressed.

In the measurement device according to the application example, it is preferable that the spectroscopic element is a Fabry-Perot etalon element.

In the measurement device according to the application example, a Fabry-Perot type etalon element is used as the spectroscopic element. This kind of Fabry-Perot etalon element has a simple configuration in which a pair of reflective films are disposed facing one another, and the element size thereof can be reduced.

Accordingly, as a result of applying this kind of spectroscopic element to the measurement device, it is possible to promote further miniaturization of the measurement device itself.

According to still another application example, there is provided an electronic apparatus including the above-mentioned measurement device.

In the abovementioned manner, the measurement device can perform rapid measurement of a highly-accurate spectroscopic image in which in-plane wavelength variation is suppressed. Accordingly, in the electronic apparatus, in a case in which various processes are implemented using the corresponding spectroscopic image, it is possible to initiate the corresponding various processes rapidly, and therefore, it is possible to achieve an improvement in performance in the electronic apparatus.

According to still another application example, there is provided a measurement method of a measurement device including a spectroscopic element that disperses light of a predetermined wavelength among incidence light, and that is capable of changing a wavelength of light that is dispersed; and an image capturing element that receives light that is dispersed by the spectroscopic element, and includes a plurality of pixels, the method including implementing measurement a plurality of times by causing measurement light to be incident to the spectroscopic element and changing the wavelength of light that is dispersed by the spectroscopic element, and predicting an optical association value when a first pixel, among the plurality of pixels in the respective plurality of repetitions of measurement, receives light of a first wavelength, on the basis of a light reception central wavelength of light that the first pixel receives, and the optical association value based on light of the light reception central wavelength that is received by the first pixel.

In the measurement method according to the application example, since the optical association value of the first wavelength, which is incident to the first pixel, is predicted on the basis of measurement results that are obtained by a plurality of repetitions of measurement, it is not necessary to control the spectroscopic element so that the light of the first wavelength is received in the first pixel, and therefore, it is possible to perform rapid measurement.

According to still another application example, there is provided a measurement method of a measurement device including a spectroscopic element that disperses light of a predetermined wavelength among incidence light, and that is capable of changing a wavelength of light that is dispersed; and an image capturing element that receives light that is dispersed by the spectroscopic element, and includes a plurality of pixels, the method including capturing images of a plurality reference subjects using a spectroscopic element and an image capturing element, and calculating respective wavelength shift amounts between the reference pixel and the plurality of pixels from differences between a reference wavelength, which is a central wavelength of light that is incident to a predetermined reference pixel, and a central wavelength of light that is respectively incident to the plurality of pixels, on the basis of each image capture result for the plurality of reference subjects.

In the measurement method according to the application example, since the wavelength shift amount is calculated from a difference between the reference wavelength of the reference pixel and the central wavelength of the first pixel, on the basis of image capture results of a plurality of reference subjects, it is possible to easily calculate the central wavelength of the light that is received by other pixels by controlling the spectroscopic element so that the light of the reference wavelength is received by the reference pixel. Accordingly, as a result of correcting the intensity of the light that is received by each pixel on the basis of the wavelength of light that is received, it is possible to suppress in-plane wavelength variations in captured images, and rapid measurement is possible.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment according to the invention will be described on the basis of drawings.

Figure 1:
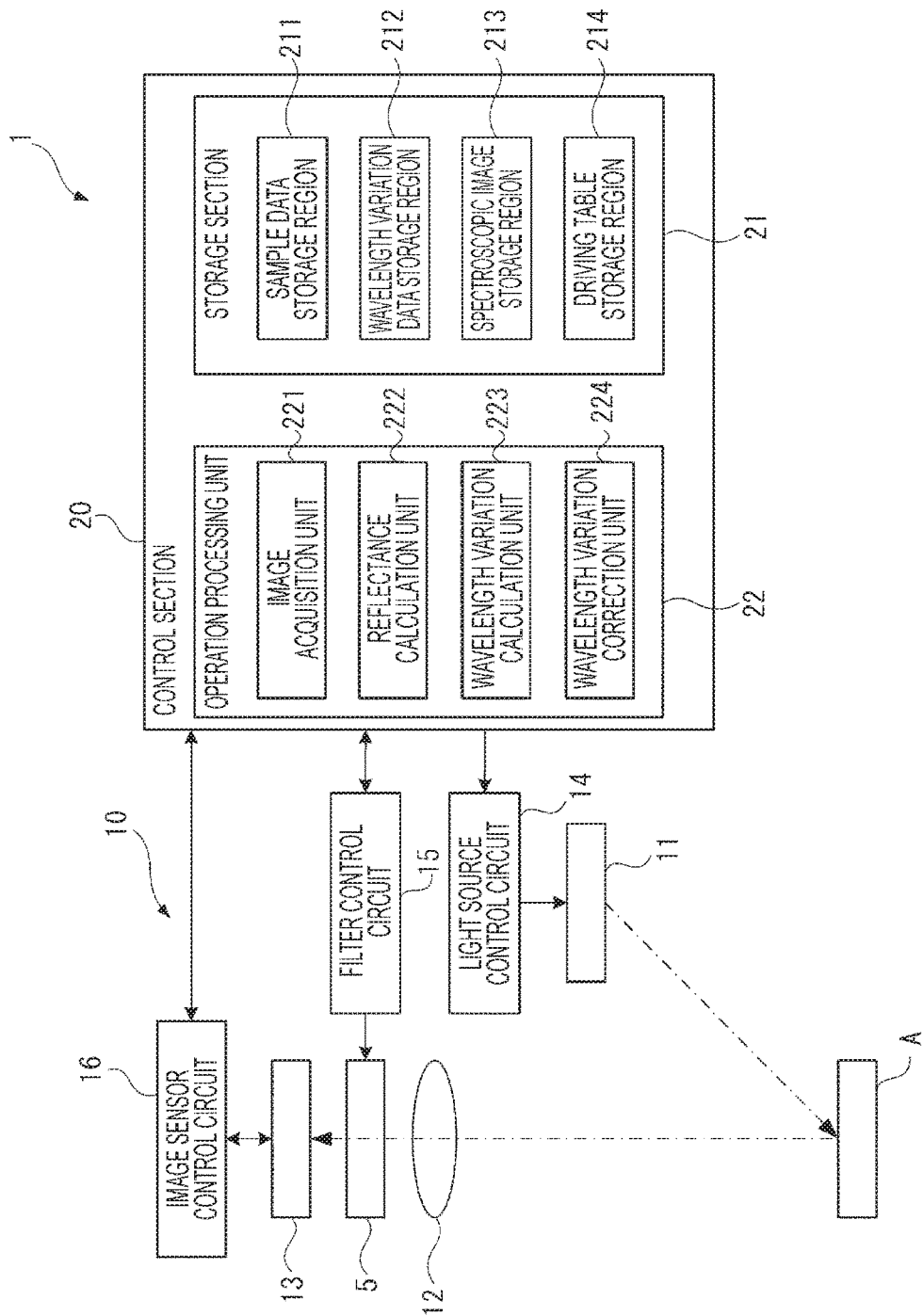
FIG. 1 is a view that shows a schematic configuration of a spectroscopic camera of a first embodiment.

FIG. 1 is a view that shows a schematic configuration of a spectroscopic camera according to the first embodiment of the invention.

In FIG. 1, a spectroscopic camera 1 is a measurement device and an electronic apparatus in the invention, and is an apparatus that acquires a spectroscopic image of a subject matter A.

As shown in FIG. 1, the spectroscopic camera 1 is configured by being provided with an image capturing module 10, and a control section 20. The image capturing module 10 implements an image capturing process of the subject matter A. The control section 20 causes image capturing of a spectroscopic image by controlling the image capturing module 10, corrects a captured spectroscopic image, and the like. Hereinafter, each configuration will be described in detail.

Configuration of Image Capturing Module 10

The image capturing module 10 is provided with a light source section 11, an incidence optical system 12, a wavelength variable interference filter 5, an image sensor 13 (an image capturing element), a light source control circuit 14, a filter control circuit 15, and an image sensor control circuit 16, and captures (measures) a spectroscopic image of the subject matter A.

The light source section 11 is provided with a light source such as an LED, for example, and irradiates the subject matter A with illumination light. Additionally, a condensing lens, which converges light that is emitted from the light source onto the subject matter A, an integrator illumination optical system, which homogenizes the light quantity distribution of the illumination light, or the like, may also be provided.

The incidence optical system 12 is configured by a plurality of lens groups, for example, and guides reflected light, which is reflected by the subject matter A, to the wavelength variable interference filter 5 and the image sensor 13. It is preferable that a telecentric optical system, which guides reflected light so that a principal ray thereof is orthogonal to the wavelength variable interference filter 5, and forms an image of the subject matter A using the image sensor 13, or the like, is provided as the incidence optical system 12.

The wavelength variable interference filter 5 is a spectroscopic element of the invention, incidence light from the subject matter A is incident thereto, and light of a predetermined spectroscopic wavelength among the incidence light is transmitted. Additionally, a specific configuration of the wavelength variable interference filter 5 will be described later.

The image sensor 13 is a light receiving element of the invention, for example, a Charge Coupled Device (CCD) or a Complementary Metal Oxide Semiconductor (CMOS), or the like can be used. The image sensor 13 includes a plurality of pixels that are arranged in a matrix form of n pixels×m pixels, for example. Each pixel detects the intensity of received light, and outputs a detection signal, which corresponds to the intensity, to the image sensor control circuit 16.

The light source control circuit 14 is a driver circuit for driving the light source section 11, and causes the subject matter A to be irradiated with illumination light by driving the light source section 11 under the control of the control section 20.

The filter control circuit 15 is a driver circuit that controls the wavelength variable interference filter 5, and for example, changes the dimension of an interval between a fixed reflective film 54 (refer to FIGS. 2 and 3) and a movable reflective film 55 (refer to FIGS. 2 and 3) in the wavelength variable interference filter 5, measures the dimension by measuring the electrostatic capacitance between the fixed reflective film 54 and the movable reflective film 55, performs feedback control that depends on the measured dimension, and the like.

The image sensor control circuit 16 is a driver circuit that drives the image sensor 13, and generates a spectroscopic image (spectroscopic image data) and outputs the generated spectroscopic image (spectroscopic image data) to the control section 20 on the basis of a detection signal that is output from each pixel of the image sensor 13. That is, each pixel of the image sensor 13 outputs a detection signal that depends on the intensity of received light as an analog signal, and the image sensor control circuit 16 generates the spectroscopic image data by converting the detection signal into a digital signal (gradation values) with 256 gradations, for example. Additionally, in the description from this point onwards, the spectroscopic image data will simply be referred to as a spectroscopic image. In addition, the pixels of the spectroscopic image will be referred to as image pixels in order to discriminate between pixels of the image sensor 13 and pixels of the spectroscopic image.

Schematic Configuration of Wavelength Variable Interference Filter 5

Next, the wavelength variable interference filter 5, which configures the spectroscopic element of the invention, will be described on the basis of the drawings.

Figure 2:
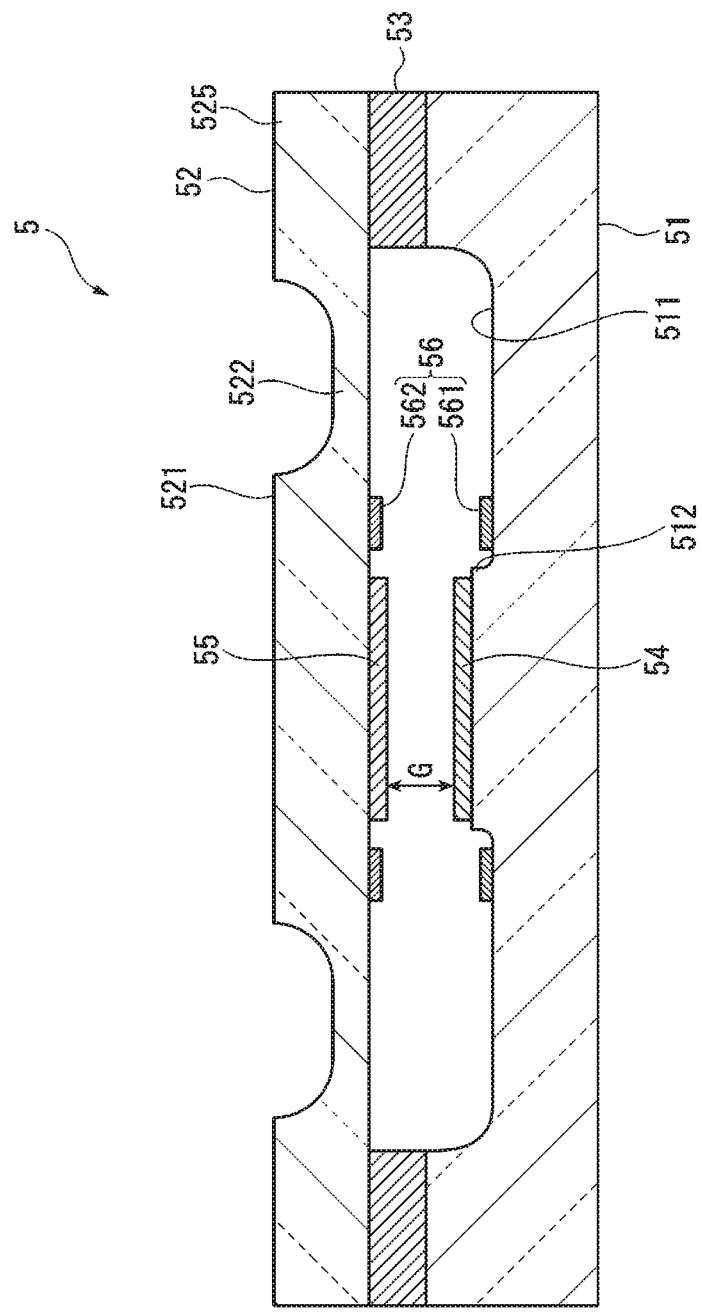
FIG. 2 is a cross-sectional view that shows a schematic configuration of a wavelength variable interference filter of the first embodiment.

FIG. 2 is a cross-sectional view that shows a schematic configuration of the wavelength variable interference filter.

The wavelength variable interference filter 5 is a wavelength variable type Fabry-Perot etalon element, and as shown in FIG. 2, is provided with a light-transmissive fixed substrate 51 and a movable substrate 52, and the fixed substrate 51 and the movable substrate 52 are configured in an integral manner as a result of bonding using a bonding film 53.

The fixed substrate 51 is provided with a first channel section 511, which is formed by etching, and a second channel section 512 having a channel depth that is more shallow than that of the first channel section 511. Further, a fixed electrode 561 is provided in the first channel section 511, and the fixed reflective film 54 is provided in the second channel section 512.

The fixed electrode 561 configures an electrostatic actuator 56 with a movable electrode 562, is, for example, formed in an annular shape that surrounds the second channel section 512, and faces the movable electrode 562, which is provided on the movable substrate 52.

For example, the fixed reflective film 54 is configured by a dielectric multi-layered film in which a metal film such as Ag, a metal film such as an Ag alloy, a high refractive layer and a low refractive layer are laminated, or a laminated body in which a metal film (an alloy film) and a dielectric multi-layered film are laminated.

The movable substrate 52 is provided with a movable section 521, and a retaining section 522, which is provided on the outside of the movable section 521, and which retains the movable section 521.

The movable section 521 is formed so that the thickness dimension thereof is larger than that of the retaining section 522. The movable section 521 is formed so that the diameter dimension thereof is larger than the diameter dimension of the outer peripheral edge of the fixed electrode 561, and the movable electrode 562 and the movable reflective film 55 are provided on a surface of the movable section 521 that faces the fixed substrate 51.

The movable electrode 562 is provided in a position that faces the fixed electrode 561, and configures the electrostatic actuator 56, which is the gap alteration section of the invention, with the fixed electrode 561.

The movable reflective film 55 is disposed in a position that faces the fixed reflective film 54 across a gap G. It is possible for a reflective film having the same configuration as that of the fixed reflective film 54, which is mentioned above, to be used as the movable reflective film 55.

The retaining section 522 is a diaphragm that surrounds the periphery of the movable section 521, and is formed so that the thickness dimension thereof is smaller than that of the movable section 521. The retaining section 522 warps more easily than the movable section 521, and it is possible to displace the movable section 521 to a fixed substrate 51 side due to a small electrostatic attractive force. As a result of this, it is possible to change the dimension of the gap G in a state in which the parallelism of the fixed reflective film 54 and the movable reflective film 55 is retained.

Additionally, in the present embodiment, a diaphragm form retaining section 522 is illustrated by way of example, but the invention is not limited to this configuration, and for example, a configuration in which a beam form retaining sections that are disposed in an equiangular manner with a center point of a planar surface set as the center thereof, are provided, or the like may also be used.

In addition, electrode pads (not illustrated in the drawings), which are individually connected to the fixed electrodes 561 and the movable electrodes 562, are provided in a portion of the wavelength variable interference filter 5. The electrode pads are connected to the filter control circuit 15.

Additionally, electrode lead-out wires may be connected to the fixed reflective film 54 and the movable reflective film 55, and may be connected to the filter control circuit 15 from the outer peripheral section of the movable substrate 52. In this case, a capacitance detection circuit, which detects the electrostatic capacitance between the fixed reflective film 54 and the movable reflective film 55, is provided in the filter control circuit 15, and it is possible to perform feedback control of a voltage that is applied to the electrostatic actuator (the fixed electrode 561 and the movable electrode 562) depending on the detected electrostatic capacitance.

Configuration of Control Section 20

As shown in FIG. 1, the control section 20 is configured by a storage section 21 and an operation processing unit 22.

The storage section 21 is configured by memory, or the like, for example, and various programs and various data for controlling the actions of the spectroscopic camera 1 are stored therein.

As shown in FIG. 1, the storage section 21 is provided with a sample data storage region 211, a wavelength variation data storage region 212, a spectroscopic image storage region 213, and a driving table storage region 214.

Although described in more detail later, the sample data storage region 211 stores sample data of reflectances which are calculated on the basis of each captured image when an item of reference subject matter is set as the subject matter A, and measurement (image capturing) is implemented using the image capturing module 10.

The wavelength variation data storage region 212 stores a wavelength shift amount that is received by each pixel in the image sensor 13. The wavelength shift amount is a difference between a central wavelength (a reference wavelength) of the light that is received by a predetermined reference pixel in the image sensor 13, and a central wavelength (a subject wavelength) of the light that is received by each pixel, and is calculated for each pixel. Detailed description of the wavelength shift amount will be given later.

The spectroscopic image storage region 213 stores a spectroscopic image.

The driving table storage region 214 stores data relating to a driving voltage that is applied to the electrostatic actuator 56 of the wavelength variable interference filter 5 during measurement (capturing of a spectroscopic image) of the subject matter A using the image capturing module 10. More specifically, V-λ data, which shows a relationship between a driving voltage that is applied to the electrostatic actuator 56, and a reference wavelength that is received by the reference pixel of the image sensor 13, is stored.

The operation processing unit 22 is configured by an operational circuit such as a Central Processing Unit (CPU), and a storage circuit such as a memory. Further, as a result of reading and executing a program (software) that is stored in the storage section 21, as shown in FIG. 1, the operation processing unit 22 functions as an image acquisition unit 221, a reflectance calculation unit 222, a wavelength variation calculation unit 223, a wavelength variation correction unit 224, and the like.

The image acquisition unit 221 causes a spectroscopic image of the subject matter A to be captured by controlling the image capturing module 10. More specifically, the image acquisition unit 221 causes the subject matter A to be irradiated with illumination light from the light source section 11 by controlling the light source control circuit 14. In addition, the image acquisition unit 221 reads a driving voltage for receiving light of a target wavelength with the reference pixel of the image sensor 13 from the V-λ data that is stored in the driving table storage region 214, and causes the driving voltage to be applied to the electrostatic actuator 56 of the wavelength variable interference filter 5 by controlling the filter control circuit 15.

Furthermore, the image acquisition unit 221 causes the image sensor 13 to be driven by controlling the image sensor control circuit 16, and acquires a spectroscopic image by causing a detection signal to be detected from each pixel.

The reflectance calculation unit 222 calculates the reflectance in a measurement position of the subject matter A, which corresponds to each image pixel of a spectroscopic image (each pixel of the image sensor 13) on the basis of the gradation value of each image pixel of a spectroscopic image that is measured (captured) by the image capturing module 10. That is, an image of each point of the subject matter A is formed in a predetermined position of the image sensor 13 using the incidence optical system 12. The reflectance calculation unit 222 calculates the reflectance of each point of the subject matter A on the basis of the gradation value of each image pixel.

The wavelength variation calculation unit 223 functions as a shift amount calculation unit of the invention, and calculates in-plane wavelength variation that is received by the image sensor 13 on the basis of the reflectance of each pixel that is calculated by the reflectance calculation unit 222. That is, the wavelength variation calculation unit 223 calculates the wavelength shift amount of the reference pixel on the basis of each pixel of the image sensor 13.

The wavelength variation correction unit 224 functions as a prediction unit and a correction unit of the invention. The wavelength variation correction unit 224 predicts the intensity of the light of the target wavelength that is included in the light that is received by each pixel of the image sensor 13, on the basis of the wavelength shift amount, and the gradation value (the intensity of the light that is incident to each pixel of the image sensor 13) in each image pixel of a captured image of the subject matter A. Further, the wavelength variation correction unit 224 corrects the gradation value of each image pixel of the spectroscopic image on the basis of the predicted intensity of the light, and outputs a corrected spectroscopic image. In other words, a spectroscopic image in which wavelength variation is corrected is output.

Additionally, the detailed description of the actions of each function of the operation processing unit 22 will be given later.

Action of Spectroscopic Camera

Next, a measurement method of the subject matter A using a spectroscopic camera 1 such as that mentioned above will be described.

In this instance, firstly, wavelength variation when measuring the subject matter A using the image capturing module 10 will be described.

Figure 3:
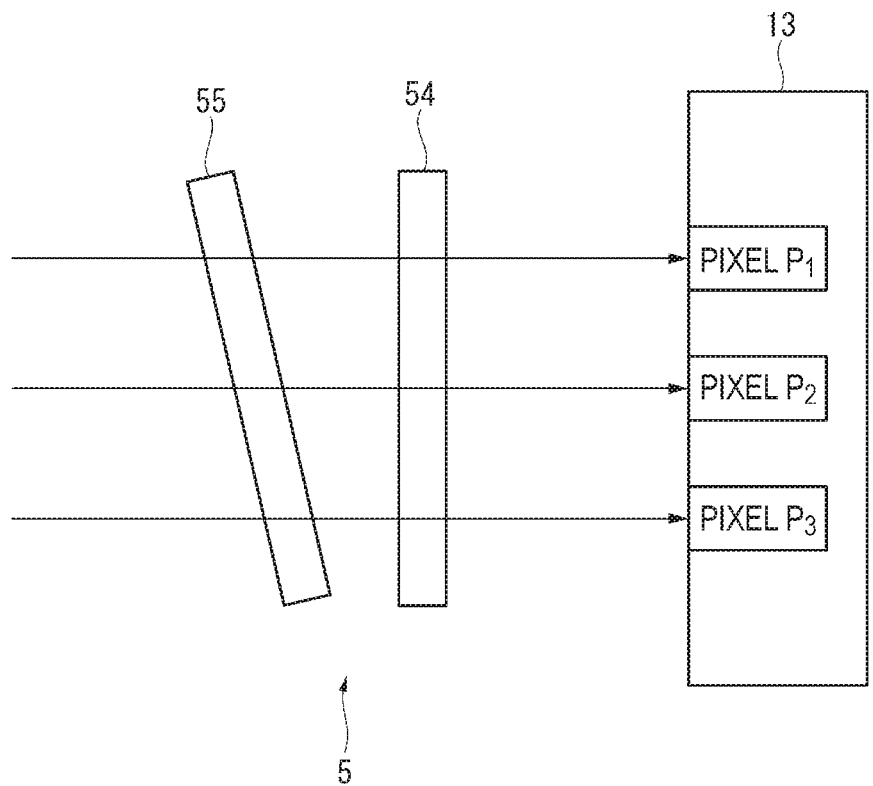
FIG. 3 is a view that shows an optical path of light that is incident to an image sensor in the first embodiment.

FIG. 3 is a view that shows a schematic of optical paths of light that is incident to pixels of the image sensor 13.

Figure 4:
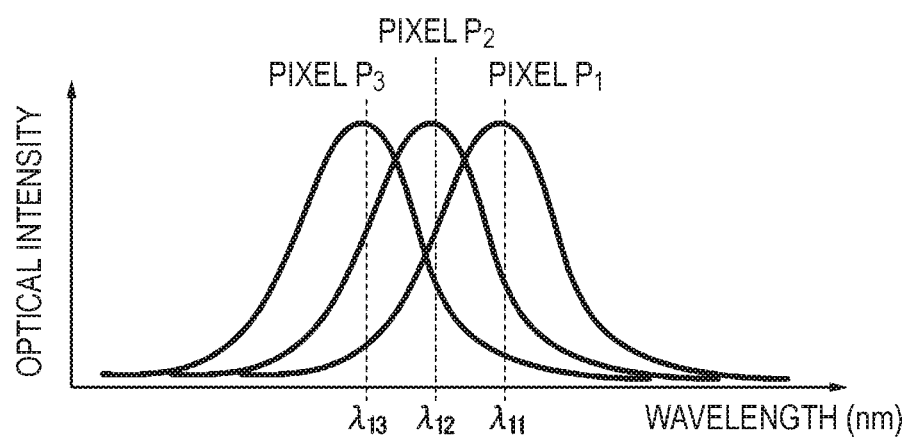
FIG. 4 is a view that shows light reception central wavelengths of light that is incident to each pixel in FIG. 3.

FIG. 4 is a view that shows light reception central wavelengths of light that is incident to each pixel $P_1$, $P_2$ and $P_3$ in FIG. 3.

In the wavelength variable interference filter 5, there are cases in which the movable reflective film 55 is relatively inclined (or in which strain or warping occur) with respect to the fixed reflective film 54 due to error, or the like during manufacturing, and the fixed reflective film 54 and the movable reflective film 55 are not completely parallel.

In a case in which the fixed reflective film 54 and the movable reflective film 55 are not parallel, as shown in FIG. 3, the distance between the fixed reflective film 54 and the movable reflective film 55 differs depending on the position of light that is incident to the wavelength variable interference filter 5, and the wavelength of light that is transmitted by the wavelength variable interference filter 5 is also shifted (in-plane wavelength variation occurs). Therefore, as shown in FIG. 4, the light having respectively different light reception central wavelengths is received in the pixels (pixels $P_1$, $P_2$ and $P_3$) of the image sensor 13. Accordingly, in a case in which a spectroscopic image is configured by converting the detection signal of each pixel, which is output from the image sensor 13, into a gradation value of each pixel without change, an image that includes wavelength variation such as that mentioned above is formed, and a spectroscopic image having high accuracy with respect to a predetermined target wavelength is not formed. In a case in which a spectroscopic image having high accuracy with respect to the target wavelength is acquired, it is necessary to acquire the intensity of light of the target wavelength that is received in each pixel.

In such an instance, in the present embodiment, a reference pixel is set in the image sensor 13, and the wavelength shift amount between the light reception central wavelength (the reference wavelength) of the light that is received by the corresponding reference pixel, and the light reception central wavelength (the subject wavelength) of the light that is received by other pixels, is calculated in advance.

Additionally, in the present embodiment, a pixel (for example, the pixel $P_2$ in FIG. 3) that is positioned in a central position of the image sensor 13 is set as the reference pixel.

Further, in the measurement of a practical spectroscopic image, a measurement process that uses a practical measurement subject as the subject matter A is implemented, and an optical association value based on the light that is received by each pixel is calculated. In addition, the light reception central wavelength (the subject wavelength) of the light that is incident to each pixel during measurement is calculated on the basis of the wavelength shift amount that is calculated beforehand. Thereafter, the optical association value when light of the target wavelength (equivalent to a first wavelength of the invention) is received by each pixel is predicted and the spectroscopic image is corrected. Additionally, in the present embodiment, the reflectance (the reflectance in a measurement position of the subject matter A for which an image is formed in each pixel) that corresponds to each pixel is calculated as the optical association value.

Hereinafter, a measurement method (an acquisition method of a spectroscopic image) using the spectroscopic camera 1 of the present embodiment will be described.

Figure 5:
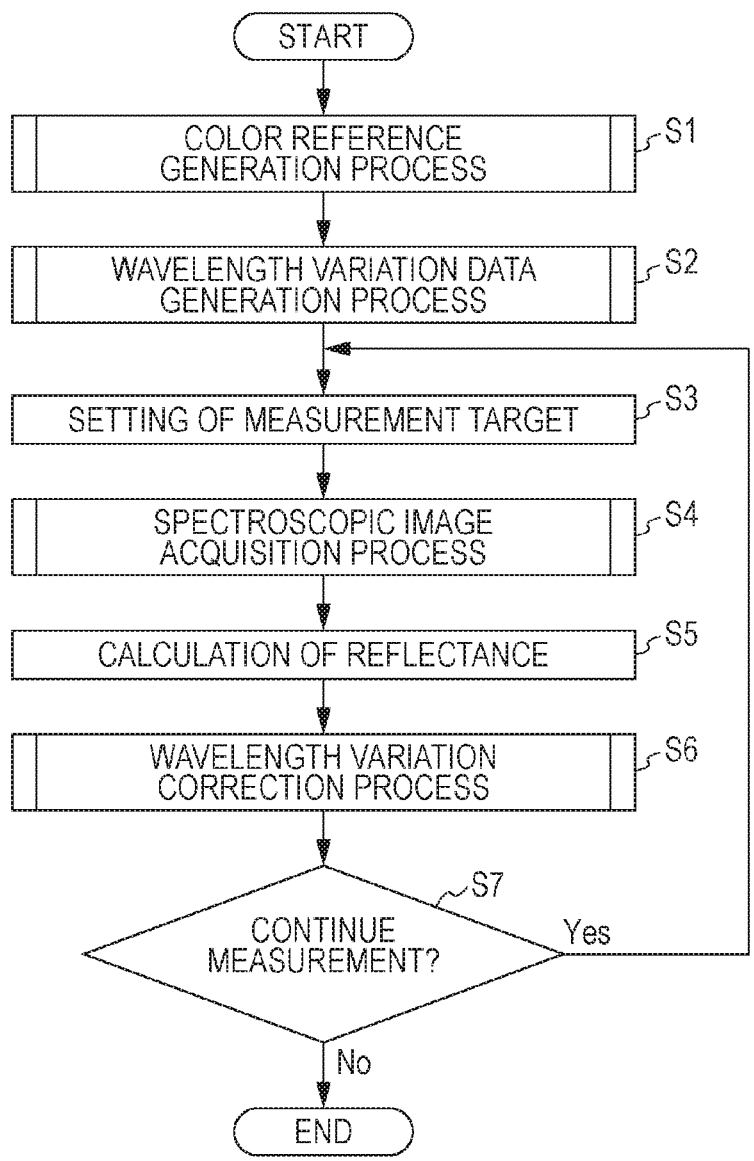
FIG. 5 is a flowchart that shows a measurement method that uses a spectroscopic camera of the first embodiment.

FIG. 5 is a flowchart that shows a measurement method of the spectroscopic image that uses the spectroscopic camera 1 of the present embodiment.

As shown in FIG. 5, in order to capture a spectroscopic image using the spectroscopic camera 1, firstly, a color reference generation process is implemented (Step S1).

Color Reference Generation Process

Figure 6:
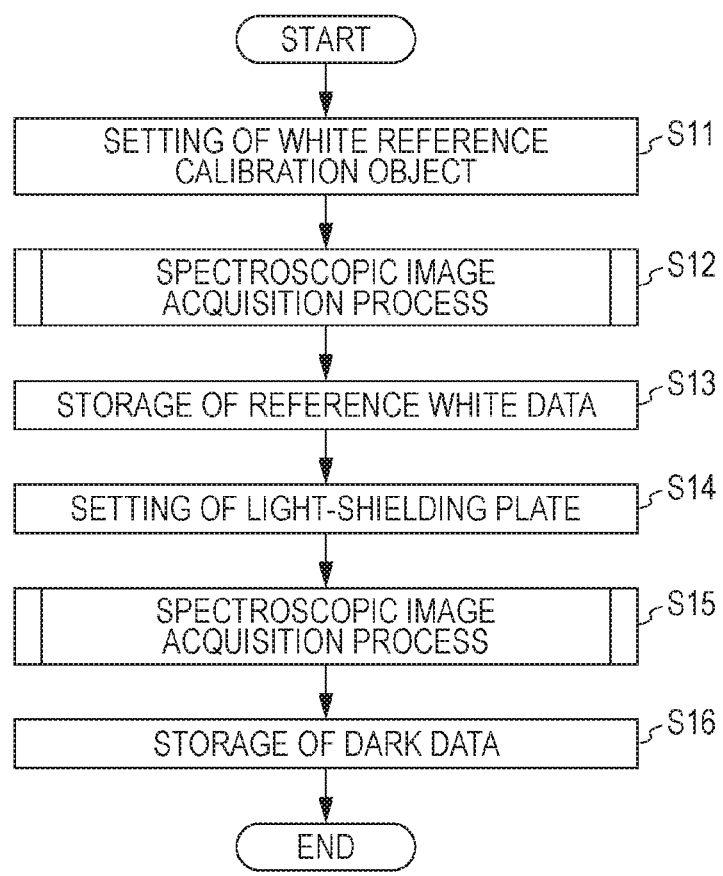
FIG. 6 is a flowchart that shows a color reference generation process of the first embodiment.

FIG. 6 is a flowchart that shows the color reference generation process of Step S1.

In Step S1, as shown in FIG. 6, firstly, a white reference calibration object is set as the subject matter A (Step S11). The white reference calibration object has a reference white surface that is configured by a white color for which the reflectance is known. In the present embodiment, a measurement subject wavelength region is the visible light range (400 nm to 700 nm), and the reference white surface of the white reference calibration object is a surface having a reflectance of 99.9% or more, for example, with respect to each wavelength of the visible light range.

In Step S11, the white reference calibration object is set so that an image capturing range of the image sensor 13 is included within the reference white surface.

Next, the image acquisition unit 221 of the control section 20 implements a spectroscopic image acquisition process of the white reference calibration object by controlling the image capturing module 10 (Step S12).

Figure 7:
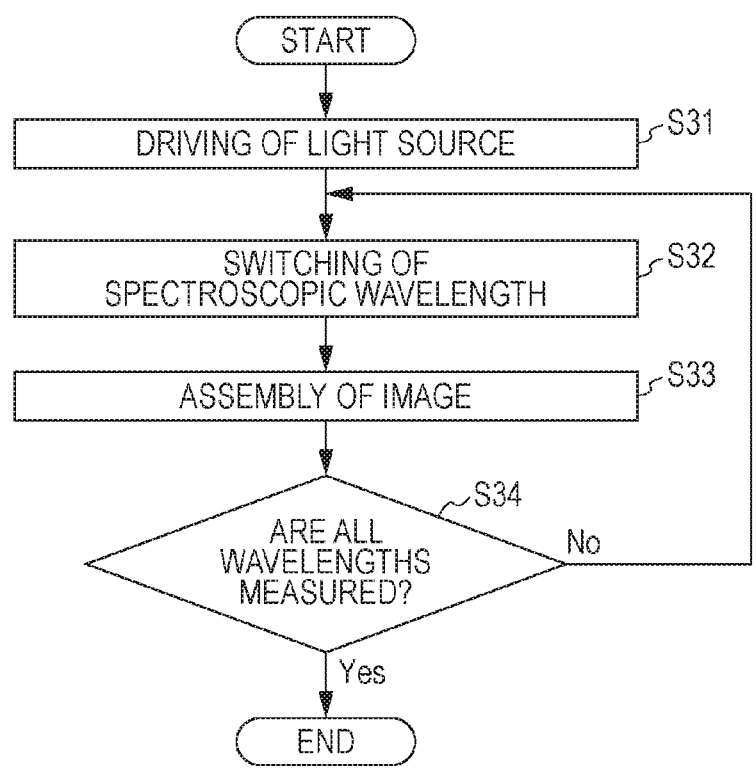
FIG. 7 is a flowchart that shows a spectroscopic image acquisition process of the first embodiment.

FIG. 7 is a flowchart that shows a spectroscopic image acquisition process. Additionally, in the present embodiment, the process that is shown in FIG. 7 is executed in Step S12, and in the spectroscopic image acquisition processes in Step S15, Step S4, and Step S22, which will be described later.

In the spectroscopic image acquisition process, as shown in FIG. 7, firstly, the image acquisition unit 221 outputs a control signal that causes the light source control circuit 14 to drive the light source section 11. As a result of this, the light source control circuit 14 causes the subject matter A to be irradiated with illumination light by driving the light source section 11 (Step S31).

Thereafter, the image acquisition unit 221 reads the V-λ data from the driving table storage region 214 of the storage section 21, and acquires a driving voltage, which depends on the wavelength (the spectroscopic wavelength) that is transmitted from the wavelength variable interference filter 5. Further, the image acquisition unit 221 outputs a control signal that corresponds to the corresponding driving voltage to the filter control circuit 15. As a result of this, the filter control circuit 15 switches the wavelength of light to be transmitted by the wavelength variable interference filter 5 by applying a driving voltage based on the control signal to the electrostatic actuator 56 of the wavelength variable interference filter 5 (Step S32).

As a result of Step S32, among light that is reflected by the subject matter A and incident to the wavelength variable interference filter 5, light of a wavelength that corresponds to the driving voltage (the distance between the reflective films 54 and 55) is transmitted by the wavelength variable interference filter 5, and is incident to the image sensor 13. Further, the detection signal that depends on the intensity of received light is output to the image sensor control circuit 16 from each pixel of the image sensor 13. The image sensor control circuit 16 generates a spectroscopic image by converting the detection signal from each pixel into gradation values having 256 gradations, for example, and outputs the spectroscopic image to the control section 20. That is, the control section 20 takes in a spectroscopic image from the image capturing module 10 (Step S33).

Next, the image acquisition unit 221 determines whether or not the measurement of all wavelengths is complete (Step S34).

In the present embodiment, the measurement subject wavelength region up to the visible light range (for example, 400 nm to 700 nm) is measured in intervals of 20 nm. In other words, spectroscopic images (16 wavelengths) in 20 nm intervals from 400 nm up to 700 nm are respectively acquired. In Step S34, it is determined whether or not spectroscopic images of the 16 wavelengths have been acquired.

Additionally, in the abovementioned manner, driving voltage for a reference wavelength that is received by the reference pixel $P_2$ in the image sensor 13 is stored in the V-λ data. Accordingly, the above-mentioned spectroscopic images of the 16 wavelengths refer to spectroscopic images in which the reference wavelengths in the reference pixel correspond to 20 nm intervals from 400 nm to 700 nm.

In addition, in the present embodiment, the light of each wavelength of the 20 nm intervals from 400 nm to 700 nm, which is transmitted by the wavelength variable interference filter 5, is transmitted by the same order (for example, a first order).

In a case in which it No is determined in Step S34, the process returns to Step S32, and the wavelength of the light to be transmitted by the wavelength variable interference filter 5 is switched to an unmeasured wavelength (a wavelength that corresponds to an unacquired spectroscopic image).

On the other hand, in a case in which it Yes is determined in Step S34, the spectroscopic image acquisition process of Step S2 is finished.

Returning to FIG. 6, after the spectroscopic image acquisition process of Step S12, each spectroscopic image that is acquired for the white reference calibration object, is stored in the storage section 21 (for example, the spectroscopic image storage region 213) as reference white data (Step S13).

Additionally, the measurement of dark values may be performed.

In a case in which the measurement of dark values is performed, for example, a light-shielding plate such as a lens cap is set on the incidence optical system 12 so that the light from the incidence optical system 12 is not incident to the image sensor 13 (Step S14).

Thereafter, a spectroscopic image acquisition process such as that shown in FIG. 7 is executed (Step S15). Further, the acquired spectroscopic image is stored in the storage section 21 (for example, the spectroscopic image storage region 213) as dark data (Step S16).

Wavelength Variation Data Generation Process

After a color reference generation process of Step S1 such as that above, a wavelength variation data generation process is implemented (Step S2).

Figure 8:
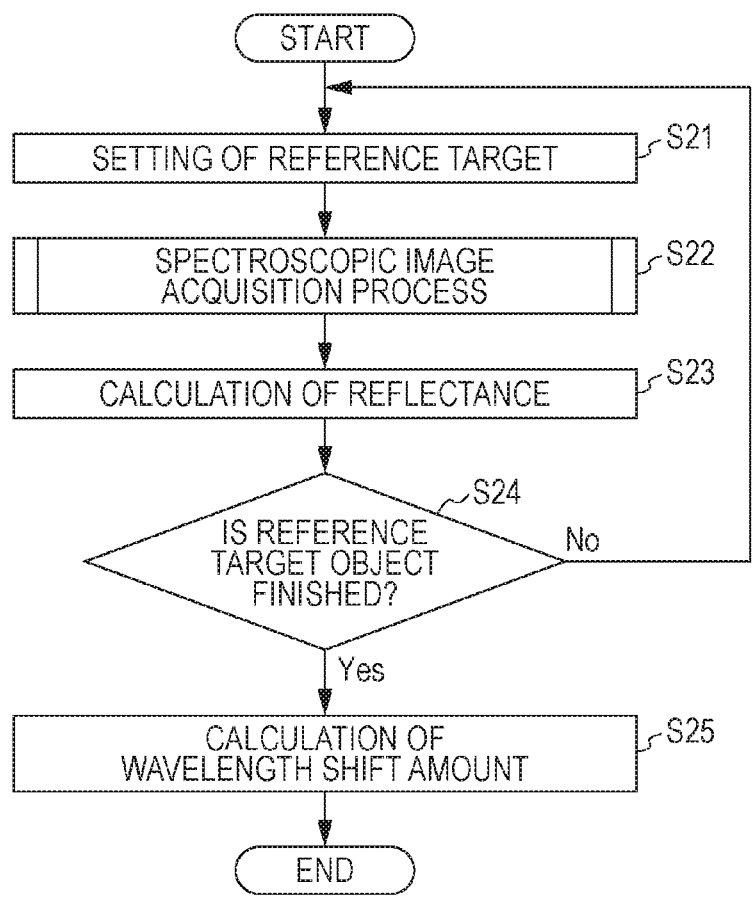
FIG. 8 is a flowchart that shows a wavelength variation data generation process of the first embodiment.

FIG. 8 is a flowchart that shows the wavelength variation data generation process.

In the wavelength variation data generation process, firstly, a reference subject is set as the subject matter A (Step S21). The reflectance of a surface (a reference surface) of the reference subject matter of which an image is captured by the spectroscopic camera 1 is known, and the reference subject matter is equivalent to the reference subject of the invention. It is more preferable that a target object in which the reflectance of the reference surface is uniform (in which there is no variation in reflectance) is used as the reference subject matter. In addition, in the wavelength variation data generation process, a plurality of types of reference subject matter in which the colors of the reference surface are different are prepared as reference subject matter.

Next, the image acquisition unit 221 of the control section 20 implements a spectroscopic image acquisition process of the subject matter A (reference subject matter) by controlling the image capturing module 10 (Step S22). The spectroscopic image acquisition process is the same as the spectroscopic image acquisition process that is shown in FIG. 7.

Further, as a result of Step S22, when a spectroscopic image of each wavelength is acquired for the reference subject matter, the reflectance calculation unit 222 calculates the reflectance on the basis of the gradation value of each image pixel of each spectroscopic image (Step S23).

Step S23 uses the gradation value of each image pixel of each spectroscopic image that is acquired in Step S22, and each item of white reference data and each item of dark data that is generated by the color reference generation process acquired by Step S1, and stored in the storage section 21.

More specifically, the reflectance calculation unit 222 sets a reference wavelength of the light that is received by a reference pixel as λn, and reads the spectroscopic images, the white reference data and the dark data for the reference wavelength λn.

In this instance, the reflectance calculation unit 222 sets a gradation value for an image pixel (x, y) of a spectroscopic image as D, sets a gradation value for an image pixel (x, y) of the white reference data as $D_{ref}$ sets a gradation value for an image pixel (x, y) of the dark data as $D_{dark}$, and calculates reflectance R (x, y) on the basis of the following Equation (1). The calculated reflectance R is stored in the sample data storage region 211 of the storage section 21.

$$R = \frac{D - D_{dark}}{D_{ref} - D_{dark}} \quad (1)$$

Next, the control section 20 determines whether or not calculation of the reflectance R is finished for all of the items of reference subject matter (Step S24). In the abovementioned manner, in the present embodiment, a plurality of types of reference subject matter in which the color of the reference surface is different are used. In Step S24, it is determined whether or not the processes of Step S22 and Step S23 are finished for the plurality of items of reference subject matter.

In a case in which No is determined in Step S24, the process returns to Step S21, the reference subject matter is changed, and the processes of Step S22 to Step S24 are repeated.

In a case in which Yes is determined in Step S24, the wavelength variation calculation unit 223 calculates a wavelength shift amount Δλ and stores the calculated wavelength shift amount Δλ in the wavelength variation data storage region 212 of the storage section 21 as wavelength variation data (Step S25).

In this instance, the process in Step S25 will be described in more detail.

Figure 9:
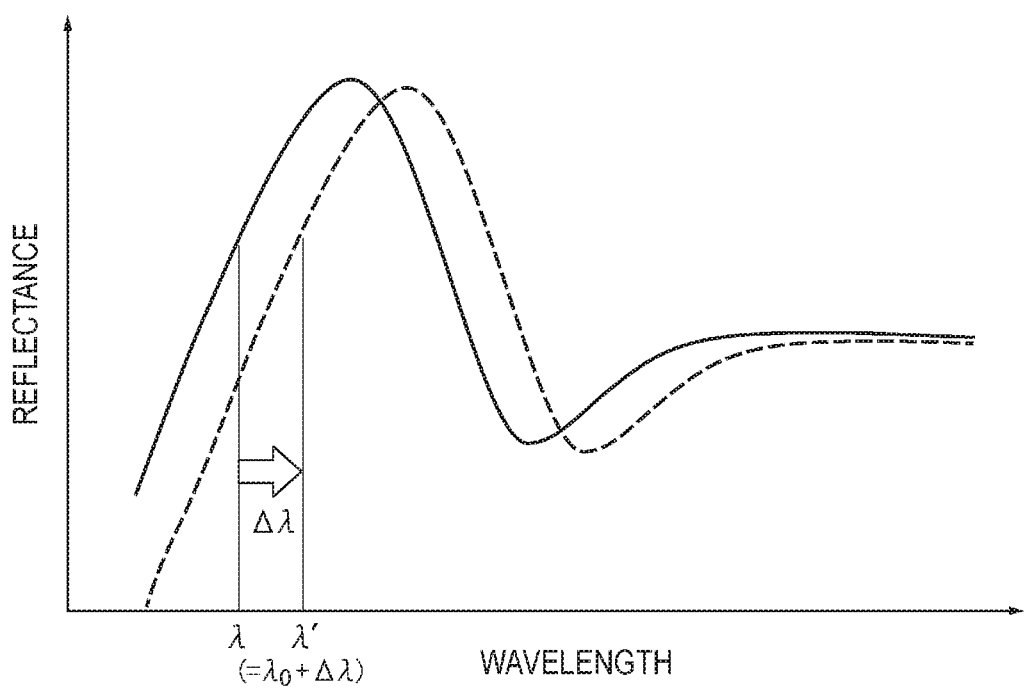
FIG. 9 is a view that shows a relationship between a central wavelength of light that is received by a reference pixel, and a light reception central wavelength of light that is received by a single other pixel that differs from the reference pixel.

FIG. 9 is a view that shows a relationship between a light reception central wavelength (the reference wavelength) of light that is received by the reference pixel, and a light reception central wavelength (the subject wavelength) of light that is received by a single other pixel that differs from the reference pixel.

In FIG. 9, the solid line is a curve that shows the reflectance R ($x_0$, $y_0$, $λ_i$) for each wavelength of a reference image pixel ($x_0$, $y_0$) that is calculated from each item of sample data, and the broken line is a curve that shows the reflectance R ($x_0$, $y_0$, $λ_i+Δλ$) for each wavelength of a single other image pixel ($x_1$, $y_1$) that is calculated from each item of sample data.

As shown in FIG. 9, in a case in which there is wavelength variation in the wavelength variable interference filter 5, differences in a spectrum curve in the reference pixel, and a spectrum curve in another pixel even occur in a case in which the same reference subject matter is measured. The reason for this is that, in the manner shown in FIGS. 3 and 4, a transmission wavelength λ of the wavelength variable interference filter differs depending on the position.

Incidentally, in the present embodiment, in the spectroscopic image acquisition process that is shown in FIG. 7, a spectroscopic image is acquired by controlling the wavelength variable interference filter 5 so that light of the reference wavelength is received by the reference pixel $P_2$ of the image sensor 13. Accordingly, in the reference image pixel ($x_0$, $y_0$) that corresponds to the reference pixel $P_2$ of the image sensor 13, light having a reflectance R ($x_0$, $y_0$, $λ_0$) is received for a reference wavelength $λ_0$. On the other hand, in a case in which there is relative inclination, warping, or the like of the fixed reflective film 54 and the movable reflective film 55, light with a wavelength that is shifted from the reference wavelength $λ_1$ by an amount that is equivalent to a predetermined wavelength shift amount Δλ is received in pixels other than the reference image pixel ($x_0$, $y_0$). Accordingly, in image pixels (x, y) other than the reference image pixel ($x_0$, $y_0$), the reflectance R (x, y, $λ_0+Δλ$) is calculated for a wavelength $λ_0+Δλ$.

In this instance, in the wavelength variation data generation process, a spectroscopic image is acquired for an item of reference subject matter that has a reference surface with uniform reflectance. Therefore, the difference (the wavelength shift amount Δλ) between the reference wavelength of the light that is incident to the reference pixel, and the wavelength of light that is incident to a first pixel in a position that differs from that of the reference pixel, is a value that is constant regardless of the color (the reflectance) of the reference surface of the reference subject matter.

Accordingly, the wavelength variation calculation unit 223 can statistically calculate the wavelength shift amounts Δλ from the sample data (the reflectances that are calculated by Step S23) for the reference subject matter of a plurality of colors. More specifically, the wavelength variation calculation unit 223 calculates the wavelength shift amount Δλ on the basis of the following Equation (2). Additionally, in the Equation (2), the variable i is a value that shows the reference subject matter that is measured.

$$F(x, y, \lambda, \Delta\lambda) = \sum_i |\tilde{R}(x, y, \lambda + \Delta\lambda) - R(x, y, \lambda)|^2 \cdot \frac{dF}{d(\Delta\lambda)} = 0 \quad (2)$$

The wavelength variation calculation unit 223 calculates the wavelength shift amount Δλ with a least squares technique that uses Equation (2). That is, the measurement results (the reflectances R that are calculated in Step S23) for the plurality of items of reference subject matter are substituted into Equation (2) above, and a Δλ with the smallest F value (F (x, y, λ, Δλ)) is calculated.

Further, the wavelength variation calculation unit 223 calculates the respective wavelength shift amounts Δλ for each pixel (each image pixel (x, y)), and stores the results in the wavelength variation data storage region 212 of the storage section 21 as wavelength variation data.

Actual Measurement Process

Returning to FIG. 5, next, an actual measurement process is implemented for a practical measurement subject (an image capture subject) for which it is desirable to acquire a spectroscopic image.

In the actual measurement process, as shown in FIG. 5, a measurement subject is set as the subject matter A (Step S3).

Further, the image acquisition unit 221 acquires a spectroscopic image for the measurement subject by implementing the same spectroscopic measurement process as that of FIG. 7 (Step S4).

In addition, the reflectance calculation unit 222 respectively calculates the reflectances R that correspond to each image pixel of each spectroscopic image that is acquired by Step S4 using a similar process to that of Step S23 (Step S5).

Thereafter, the wavelength variation correction unit 224 implements a wavelength variation correction process (Step S6).

In the wavelength variation correction process of Step S6, the wavelength variation correction unit 224 predicts the reflectance for a target wavelength on the basis of the reflectance that is calculated by Step S5, and the light reception central wavelength of the light that is received by each pixel of the image sensor 13, and corrects the wavelength variation of the spectroscopic image.

Additionally, in the present embodiment, the wavelength variation correction unit 224 predicts the reflectance in each position of the measurement subject for which an image is formed for each pixel of the image sensor 13, as the optical association value in the invention. The reason for this is that reflectance is a value in which the intensity (the gradation value) of the light is corrected for the measurement subject using a reference value of the reference white data, a dark value of the dark data, or the like, and it is possible to suppress the influences of illumination variations in the illumination light from the light source section 11 and shading due to a lens such as the incidence optical system 12. Additionally, the gradation value (the intensity of the light that is received by each pixel of the image sensor 13) of each image pixel (x, y), absorbance, which shows the light that is absorbed by the subject matter A, or the like, may be used as the optical association value.

Hereinafter, the wavelength variation correction process will be described in more detail.

Figure 10:
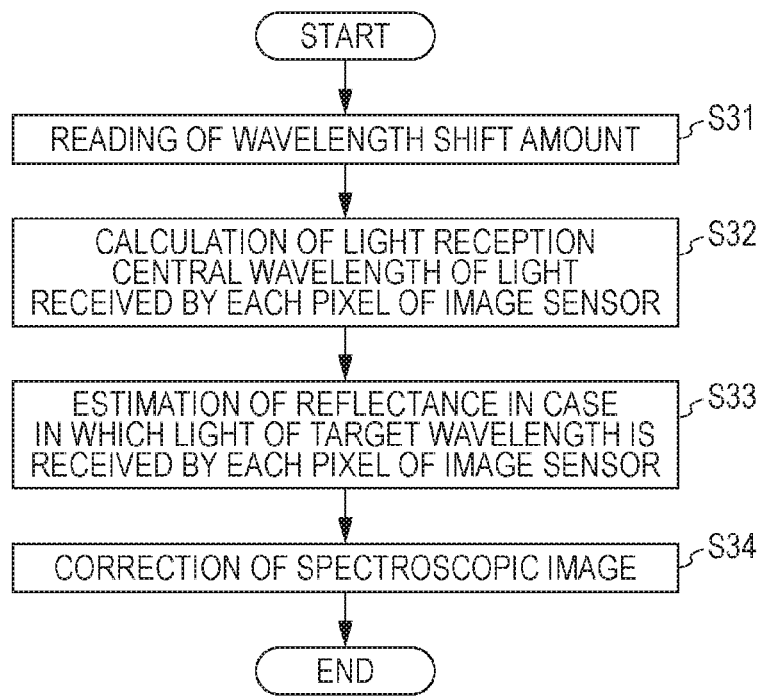
FIG. 10 is a flowchart that shows a wavelength variation correction process in the first embodiment.
Figure 11:
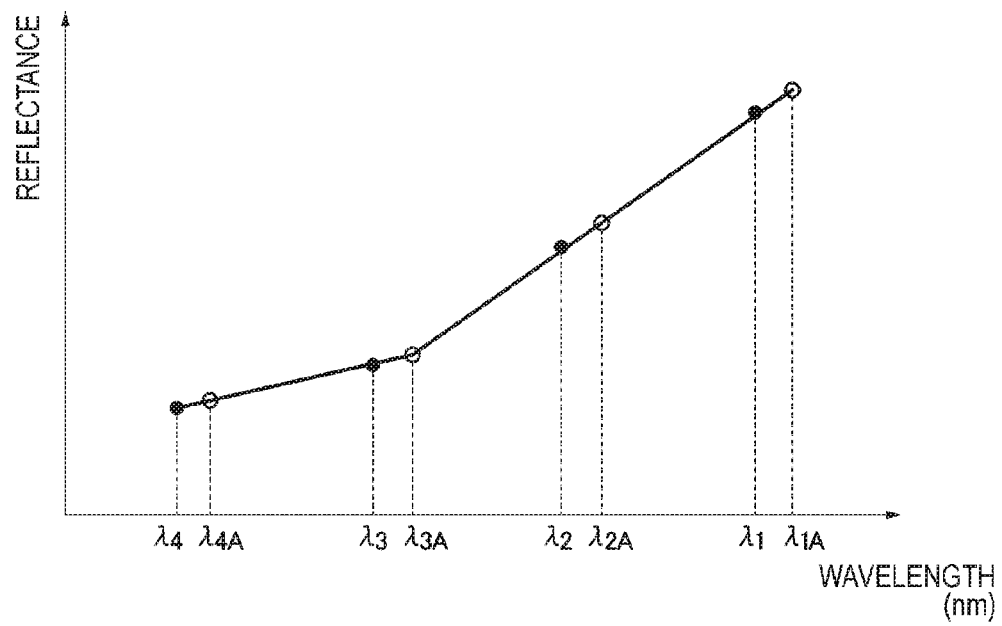
FIG. 11 is a view for describing a prediction method of reflectances for target wavelengths in a first pixel in the first embodiment.

FIG. 10 is a flowchart of the wavelength variation correction process. FIG. 11 is a view for describing a calculation method of reflectances for target wavelengths in an image pixel (x, y) in the present embodiment.

In this instance, as one example, as shown in FIG. 11, a case in which the reflectances are predicted when light of target wavelengths $\lambda_1$, $\lambda_2$, $\lambda_3$ and $\lambda_4$ is received in a predetermined pixel (the first pixel) of the image sensor 13 in a case in which four spectroscopic images, in which the light that is received by the reference pixel for a measurement subject corresponds to target wavelengths $\lambda_1$, $\lambda_2$, $\lambda_3$ and $\lambda_4$, will be described.

In this case, firstly, the wavelength variation correction unit 224 reads the wavelength shift amounts Δλ of a first image pixel ($x_1$, $y_1$) that corresponds to a first pixel in the four spectroscopic images, from the wavelength variation data storage region 212 (Step S31).

Next, the wavelength variation correction unit 224 respectively calculates light reception central wavelengths (subject wavelengths) $\lambda_{1A}$, $\lambda_{2A}$, $\lambda_{3A}$ and $\lambda_{4A}$ of the light that is received in the first pixel as $\lambda_{1A}=\lambda_1+\Delta\lambda$, $\lambda_{2A}=\lambda_2+\Delta\lambda$, $\lambda_{3A}=\lambda_3+\Delta\lambda$ and $\lambda_{4A}=\lambda_4+\Delta\lambda$ (Step S32).

Further, the wavelength variation correction unit 224 predicts reflectances $R_1$, $R_2$, $R_3$ and $R_4$ for the target wavelengths $\lambda_1$, $\lambda_2$, $\lambda_3$ and $\lambda_4$ of the measurement position, which corresponds to the first pixel using an interpolation process (Step S33).

In the present embodiment, as shown in FIG. 11, the reflectances are predicted using linear interpolation as an interpolation process.

In FIG. 11, the reflectances $R_{1A}$, $R_{2A}$, $R_{3A}$ and $R_{4A}$ that are calculated in Step S5 are reflectances for the subject wavelengths $\lambda_{1A}$, $\lambda_{2A}$, $\lambda_{3A}$ and $\lambda_{4A}$. Accordingly, the wavelength variation correction unit 224 predicts the reflectance $R_2$ for the target wavelengths $\lambda_1$, $\lambda_2$ and $\lambda_3$ using polynomial interpolation as shown in Equations (3) to (5) below.

$$R_1 = \frac{\lambda_1 - \lambda_{2A}}{\lambda_{1A} - \lambda_{2A}} R_{1A} + \frac{\lambda_{1A} - \lambda_1}{\lambda_{1A} - \lambda_{2A}} R_{2A} \quad (3)$$

$$R_2 = \frac{\lambda_2 - \lambda_{3A}}{\lambda_{2A} - \lambda_{3A}} R_{2A} + \frac{\lambda_{2A} - \lambda_2}{\lambda_{2A} - \lambda_{3A}} R_{3A} \quad (4)$$

$$R_3 = \frac{\lambda_3 - \lambda_{4A}}{\lambda_{3A} - \lambda_{4A}} R_{3A} + \frac{\lambda_{3A} - \lambda_3}{\lambda_{3A} - \lambda_{4A}} R_{4A} \quad (5)$$

Additionally, in a case in which it is not possible to perform the interpolation process for the using polynomial interpolation in the manner of the reflectance $R_4$ for the target wavelength $\lambda_4$, as shown in Equation (6), an interpolation process that uses an extrapolation technique may be performed.

$$R_4 = \frac{\lambda_{3A} - \lambda_4}{\lambda_{3A} - \lambda_{4A}} R_{4A} - \frac{\lambda_{4A} - \lambda_4}{\lambda_{3A} - \lambda_{4A}} R_{3A} \quad (6)$$

The wavelength variation correction unit 224 predicts the reflectances $R_1$, $R_2$, $R_3$ and $R_4$ that correspond to each image pixel (x, y) by implementing the above-mentioned processes for each image pixel (each pixel of the image sensor) of a spectroscopic image.

Further, the wavelength variation correction unit 224 corrects the wavelength variation of each spectroscopic image by substituting the reflectances $R_{1A}$, $R_{2A}$, $R_{3A}$ and $R_{4A}$ that are calculated in Step S5 with the reflectances $R_1$, $R_2$, $R_3$ and $R_4$ that are predicted in Step S33 (Step S34). In addition, the wavelength variation correction unit 224 outputs the corrected spectroscopic images from an output unit (for example, a display, a printing apparatus, or the like).

Thereafter, returning to FIG. 5, it is determined whether or not to continue measurement of a measurement subject (Step S7). In a case in which Yes is determined in Step S7 and there is another measurement subject, the process returns to Step S3. In addition, in a case in which No is determined in Step S7, the measurement process is finished.

Measurement Time and Measurement Accuracy of Wavelength Variation Correction Process Next, the measurement time and measurement accuracy in a case in which the reflectances at target wavelength in each pixel are predicted using the wavelength variation correction process of the invention will be described through comparison with Comparative Examples 1 and 2.

Figure 12:
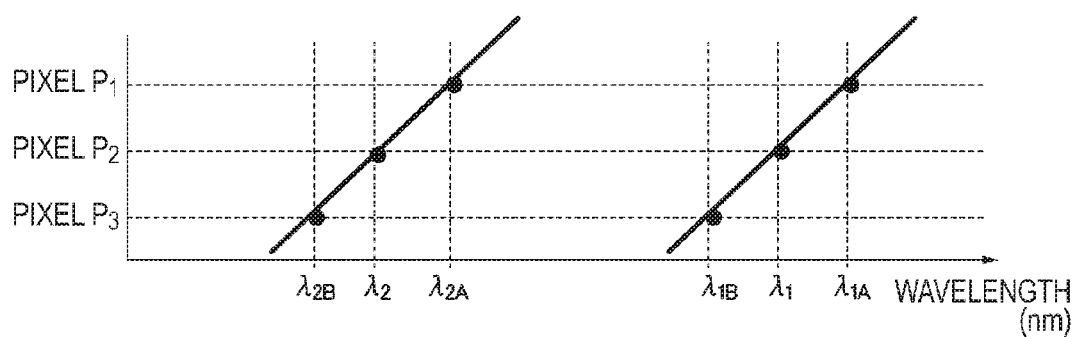
FIG. 12 is a view that shows a light reception central wavelength in each pixel in Comparative Example 1, in which a detection signal of light that is received by each pixel of the image sensor in FIG. 3, is acquired using a first repetition of measurement, and is set as a detection signal for a target wavelength without change.

FIG. 12 is a view that shows light reception central wavelengths of light that is received by each pixel $P_1$, $P_2$ and $P_3$ in Comparative Example 1, which acquires a detection signal of light that is received by the pixels $P_1$, $P_2$ and $P_3$ of the image sensor 13 that is shown in FIG. 3 using a single repetition of measurement, and adopts the acquired detection signals as the detection signal for the target wavelength without change.

As shown in FIG. 12, when a spectroscopic image of the target wavelength $\lambda_1$ is acquired in Comparative Example 1, the wavelength variable interference filter 5 is controlled so that the light of the target wavelength $\lambda_1$ (=the reference wavelength $\lambda_1$) is incident to the reference pixel $P_2$. In this case, the light of the wavelength $\lambda_1$ is detected in the reference pixel $P_2$, but light of a wavelength $\lambda_{1A}$ ($\neq \lambda_1$) is detected in the pixel $P_1$, and light of a wavelength $\lambda_{1B}$ ($\neq \lambda_1$) is detected in the pixel $P_3$.

The same applies when acquiring a spectroscopic image of the target wavelength $\lambda_2$, and the wavelength variable interference filter 5 is controlled so that the light of the target wavelength $\lambda_2$ is incident to the reference pixel $P_2$. Accordingly, the light of the target wavelength $\lambda_2$ is detected in the reference pixel $P_2$, but light having light reception central wavelengths (subject wavelengths) $\lambda_{2A}$ and $\lambda_{2B}$ that differ from the target wavelength $\lambda_2$ are detected in the pixels $P_1$ and $P_3$.

Accordingly, an image in which errors are superimposed due to wavelength variations is formed as the spectroscopic image that is output from the image sensor 13, and it is not possible to acquire a spectroscopic image having high accuracy (the measurement accuracy is poor).

Figure 13:
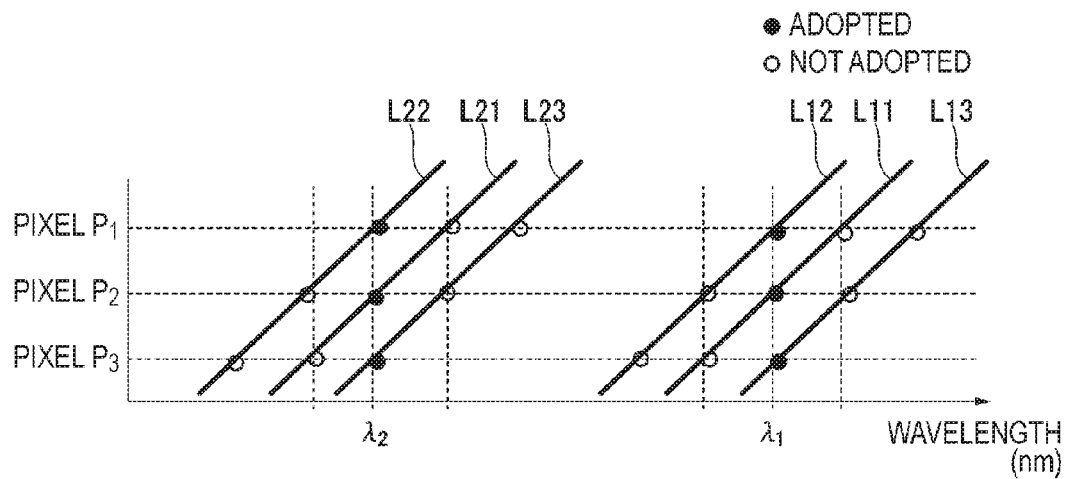
FIG. 13 is a view that shows a light reception central wavelength that is received by each pixel in Comparative Example 2, in which a detection signal of light that is received by each pixel of the image sensor in FIG. 3, is acquired using a plurality of repetitions of measurement.

FIG. 13 is a view that shows light reception central wavelengths of light that is received by each pixel $P_1$, $P_2$ and $P_3$ in Comparative Example 2, in which a detection signal of light that is received by the pixels $P_1$, $P_2$ and $P_3$ of the image sensor 13 that is shown in FIG. 3 is acquired using a plurality of repetitions of measurement.

When a spectroscopic image of the target wavelength $\lambda_1$ is acquired in Comparative Example 2, the wavelength variable interference filter 5 is controlled so that the light of the target wavelength $\lambda_1$ is incident to the reference pixel $P_2$. At this time, light having the light reception central wavelengths that are shown on the line L11 in FIG. 13 is detected in each pixel $P_1$, $P_2$ and $P_3$. Further, only a detection signal from the reference pixel $P_2$, which receives the light of the target wavelength $\lambda_1$, is adopted, and detection signals from other pixels are not adopted.

Next, the wavelength variable interference filter 5 is controlled so that the light of the target wavelength $\lambda_1$ is incident to the pixel $P_1$. As a result of this, light having the light reception central wavelengths that are shown on the line L12 in FIG. 13 is detected in each pixel $P_1$, $P_2$ and $P_3$. Further, only a detection signal from the pixel $P_1$, which receives the light of the target wavelength $\lambda_1$, is adopted, and detection signals from other pixels are not adopted.

Furthermore, the wavelength variable interference filter 5 is controlled so that the light of the target wavelength $\lambda_1$ is incident to the pixel $P_3$. As a result of this, light having the light reception central wavelengths that are shown on the line L13 in FIG. 13 is detected in each pixel $P_1$, $P_2$ and $P_3$. Further, only a detection signal from the pixel $P_3$, which receives the light of the target wavelength $\lambda_1$, is adopted, and detection signals from other pixels are not adopted.

In addition, the same applies in a case of acquiring a spectroscopic image of the target wavelength $\lambda_2$, a plurality of measurements (measurements along the lines L21, L22 and L23 in FIG. 13) are implemented, and only a detection signal of a pixel that receives the light of the target wavelength $\lambda_2$ is adopted.

In Comparative Example 2, since a detection signal for light of the target wavelength is adopted for each pixel, it is possible to acquire a spectroscopic image having high accuracy. However, since it is necessary to implement a plurality of repetitions of measurement by recontrolling the wavelength variable interference filter 5 so that the light of the target wavelength is incident to each pixel in order to acquire a spectroscopic image of a single wavelength, the duration of the measurement time (a time relating to the acquisition of a spectroscopic image) is long.

Figure 14:
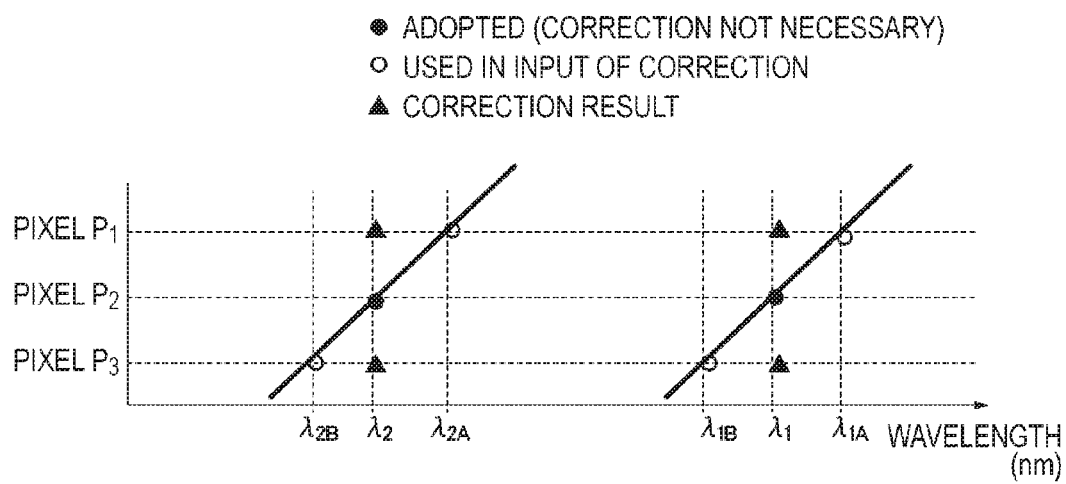
FIG. 14 is a view that shows a light reception central wavelength that is received by each pixel in a case in which a detection signal of light that is received by each pixel of the image sensor in FIG. 3, is corrected using the measurement method of the first embodiment.

FIG. 14 is a view that shows light reception central wavelengths of light that is received by each pixel $P_1$, $P_2$ and $P_3$ in a case in which a detection signal of light that is received by the pixels $P_1$, $P_2$ and $P_3$ of the image sensor 13 that is shown in FIG. 3 is corrected using the above-mentioned measurement method of the present embodiment.

In the present embodiment, in the same manner as FIG. 12, when spectroscopic measurement is implemented for the target wavelength $\lambda_1$, the wavelength variable interference filter 5 is controlled so that the light of the target wavelength $\lambda_1$ is received in to the reference pixel $P_2$. At this time, the light of the wavelength $\lambda_1$ is detected in the reference pixel $P_2$, but, in the same manner as Comparative Example 1, light of a wavelength $\lambda_{1A}$ is detected in the pixel $P_1$, and light of a wavelength $\lambda_{1B}$ is detected in the pixel $P_3$.

In this instance, in the present embodiment, the reflectance when the light of the target wavelength $\lambda_1$ is received by the pixels $P_1$ and $P_3$ is predicted. Reflectance is a quantity in which the intensity of the light that is detected by each pixel $P_1$, $P_2$ and $P_3$ is corrected using reference data or dark data, and in other words, a spectroscopic image when the light of the target wavelength $\lambda_1$ is detected by the pixels $P_1$ and $P_3$, is output in the manner that is shown by the triangular points in FIG. 14.

Accordingly, in the present embodiment, it is possible to capture (measure) a spectroscopic image having higher accuracy than Comparative Example 1 more rapidly than Comparative Example 2.

Operational Effects of First Embodiment

In the present embodiment, in the spectroscopic camera 1, a measurement process (capturing of a spectroscopic image), which causes light from a measurement subject to be incident to the wavelength variable interference filter 5, and causes light that is transmitted by the wavelength variable interference filter 5 to be received by the image sensor 13, is implemented a plurality of times by changing the wavelength of transmission light that is transmitted by the wavelength variable interference filter 5. Further, the wavelength variation correction process predicts the reflectance when each pixel of the image sensor 13 receives light of a target wavelength, on the basis of a light reception central wavelength that each pixel of the image sensor 13 receives, and the reflectance that is calculated on the basis of the gradation value of each image pixel, which corresponds to each pixel of the image sensor 13.

Accordingly, it is not necessary to control the wavelength variable interference filter so that light of the target wavelength is received in each pixel when acquiring a spectroscopic image of a single target wavelength, and therefore, it is possible to make control of the wavelength variable interference filter 5 simple, and it is possible to reduce the time relating to measurement. In addition, since the reflectance when the light of the target wavelength is received in each pixel, is predicted, wavelength variation in the spectroscopic image is suppressed, and therefore, it is possible to acquire a spectroscopic image having high accuracy.

In the present embodiment, the wavelength variation correction unit 224 predicts the reflectance using polynomial interpolation, which uses the reflectances of two wavelengths on either side of a target wavelength when calculating the reflectance for the target wavelength of a first image pixel (x, y). In other words, in the prediction of the target wavelength, the reflectance for the target wavelength $\lambda_1$ is predicted using an interpolation process that uses a wavelength that is larger than the target wavelength and the reflectance that is calculated for that wavelength, and a wavelength that is smaller than the target wavelength and the reflectance that is calculated for that wavelength. As a result of using this kind of polynomial interpolation, it is possible to reduce the error during the prediction of reflectance, and therefore, it is possible to predict reflectance with high accuracy.

In the present embodiment, the reflectance for the target wavelength is predicted using linear interpolation. In the prediction of the reflectance that uses this kind of linear interpolation, as shown in Equations (3) to (6), it is possible to predict the reflectance using simple operational expressions, and therefore, it is possible to achieve a reduction in the processing load and shortening of the processing time in an operational process.

In the present embodiment, the wavelength variation calculation unit 223 calculates the wavelength shift amount $\Delta\lambda$, which is a difference between a reference wavelength of light that is received in a reference pixel, and a central wavelength of light that is received in each pixel, on the basis of a plurality of items of sample data that are obtained using a spectroscopic image acquisition process on a plurality of items of reference subject matter.

Therefore, as long as the wavelength variable interference filter 5 is controlled so that light of the target wavelength is received in the reference pixel, since the light reception central wavelength (the subject wavelength) of the light that is received in each pixel is a wavelength in which the wavelength shift amount $\Delta\lambda$ is added to the reference wavelength, it is possible to calculate the subject wavelength easily and with high accuracy.

Accordingly, the wavelength variation correction unit 224 can calculate the reflectance for the light of the target wavelength easily and with high accuracy on the basis of the calculated subject wavelength of the light that is received by each pixel, and the reflectance of a measurement position that corresponds to each pixel.

In the present embodiment, the reflectances of a plurality of items of reference subject matter, which are used in the wavelength variation data generation process, are known, and the plurality of items of reference subject matter have uniform reflectances on a reference surface.

In this case, a spectroscopic image for a plurality of wavelengths is acquired for an item of reference subject matter, and the spectrum curve of each pixel is calculated. At this time, in the reference pixel and each pixel, in a case in which there is wavelength shift in the received light as shown in FIG. 9, the spectrum curve of reflectance is shifted by an amount that is equivalent to the wavelength shift amount $\Delta\lambda$. Accordingly, the wavelength variation calculation unit 223 can easily calculate the wavelength shift amount $\Delta\lambda$ by using a statistical method, or the like.

In the present embodiment, the wavelength variation calculation unit 223 acquires sample data on the basis of a plurality of reference subjects having different reflectances, and calculates the wavelength shift amount $\Delta\lambda$ on the basis of the sample data. In this case, it is possible to calculate the wavelength shift amount $\Delta\lambda$ on the basis of a plurality of items of sample data using a statistical method. Accordingly, it is possible to calculate the wavelength shift amount $\Delta\lambda$ with higher accuracy than a case in which the wavelength shift amount is calculated on the basis of an image capture result of a single type of reference subject, for example.

In the present embodiment, the wavelength variation calculation unit 223 calculates the wavelength shift amount $\Delta\lambda$ with a least squares technique as shown in Equation (2). Therefore, it is possible to calculate a wavelength shift amount having high accuracy using a simple operational expression.

In the present embodiment, the wavelength variable interference filter 5, which is a wavelength variable type Fabry-Perot type etalon element, is used as the spectroscopic element of the invention. The wavelength variable interference filter 5 has a simple configuration in which the pair of reflective films 54 and the movable reflective film 55 are disposed facing one another, and the filter size thereof can be reduced, and therefore, it is possible to promote further miniaturization of the spectroscopic camera 1.

Second Embodiment

Next, a second embodiment according to the invention will be described on the basis of drawings.

In the first embodiment, which is mentioned above, an example in which the wavelength variation correction unit 224 predicts the reflectance when the light of the target wavelength is received in each pixel in Step S33 using linear interpolation, is shown.

In contrast to this, the second embodiment differs from the above-mentioned first embodiment in that spline interpolation is used in the interpolation process.

Additionally, in the description from this point onwards, the same reference symbols will be given to configurations that are the same as those of the above-mentioned first embodiment, and description thereof will be omitted or simplified.

Figure 15:
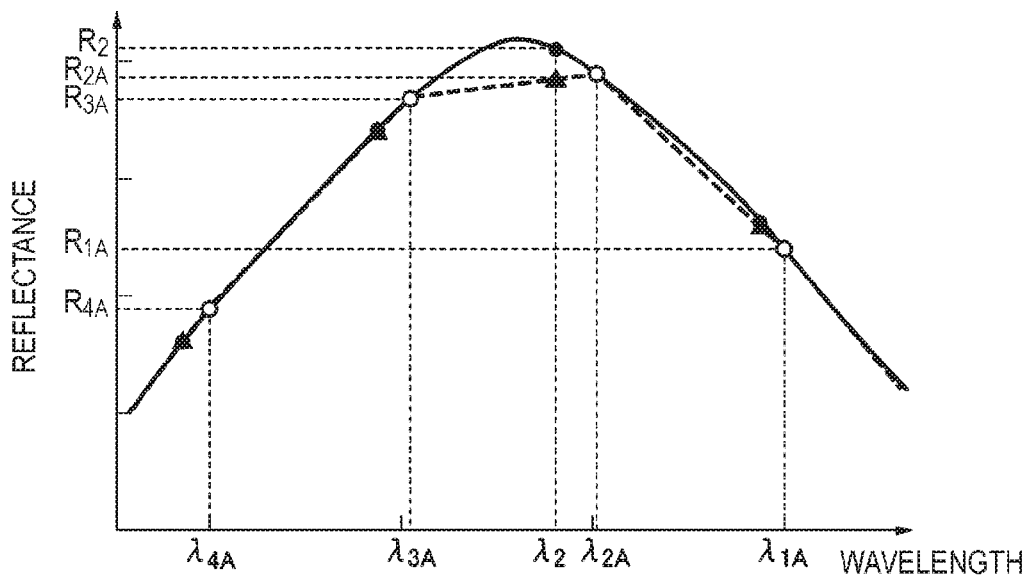
FIG. 15 is a view for describing a prediction method of reflectances for target wavelengths in a first pixel in a second embodiment.

FIG. 15 is a view for describing a prediction method of reflectances for target wavelengths in a first pixel in the second embodiment. Additionally, in FIG. 15, the broken line shows linear interpolation, and the solid line shows spline interpolation. In addition, the white circles are reflectances that are calculated using Step S5, and are reflectances for the subject wavelength of light that is received in the first pixel of the image sensor. The black circles are reflectances for the target wavelength that are predicted using the wavelength variation correction process in the present embodiment. In addition, the black triangles are reflectances for the target wavelength that are predicted in a case of performing the same linear interpolation as the first embodiment.

In the second embodiment, the wavelength variation correction unit 224 predicts the reflectances for the target wavelength using spline interpolation.

In other words, as shown in FIG. 15, the wavelength variation correction unit 224 sets the reflectances $R_{1A}$, $R_{2A}$, $R_{3A}$ and $R_{4A}$ as measurement points for the subject wavelengths $\lambda_{1A}$, $\lambda_{2A}$, $\lambda_{3A}$ and $\lambda_{4A}$ of the first pixel, which are calculated in Step S5, and calculates a polynomial approximation equation (a spline curve) that passes through each measurement point. Further, the target wavelengths are substituted into the polynomial approximation equation, and the reflectances are calculated for the target wavelengths. For example, in the example of FIG. 15, the reflectance $R_2$ is calculated for the target wavelength $\lambda_2$.

Operational Effects of Present Embodiment

In the present embodiment, the reflectance when the light of the target wavelength is received in the first pixel is predicted using spline interpolation. As a result of this, it is possible to improve the prediction accuracy of reflectance.

In a case in which the reflectances is predicted using linear interpolation such as that of the first embodiment, the reflectances are predicted for the target wavelength as points along a straight line that links respective measurement points. In this instance, the error is large in a case in which the reflectance changes in a non-linear manner between each measurement point. In particular, the error is very large in a case in which there are few measurement points. In contrast to this, in the prediction of reflectance based on a spline curve such as that of the present embodiment, since the prediction of reflectance is performed using a non-linear form that is closer to a practical spectroscopic spectrum, it is possible to acquire a spectroscopic image having high accuracy.

Third Embodiment

Next, a third embodiment according to the invention will be described on the basis of drawings.

An example in which the wavelength variation correction unit 224 predicts the reflectance when the light of the target wavelength is received in each pixel using linear interpolation in Step S33 in the above-mentioned first embodiment, and an example in which the wavelength variation correction unit 224 predicts the reflectance when the light of the target wavelength is received in each pixel using spline interpolation in Step S33 in the above-mentioned second embodiment, are shown.

In contrast to this, the third embodiment differs from the above-mentioned first and second embodiments in that piecewise hermite interpolation is used in the interpolation process.

Figure 16:
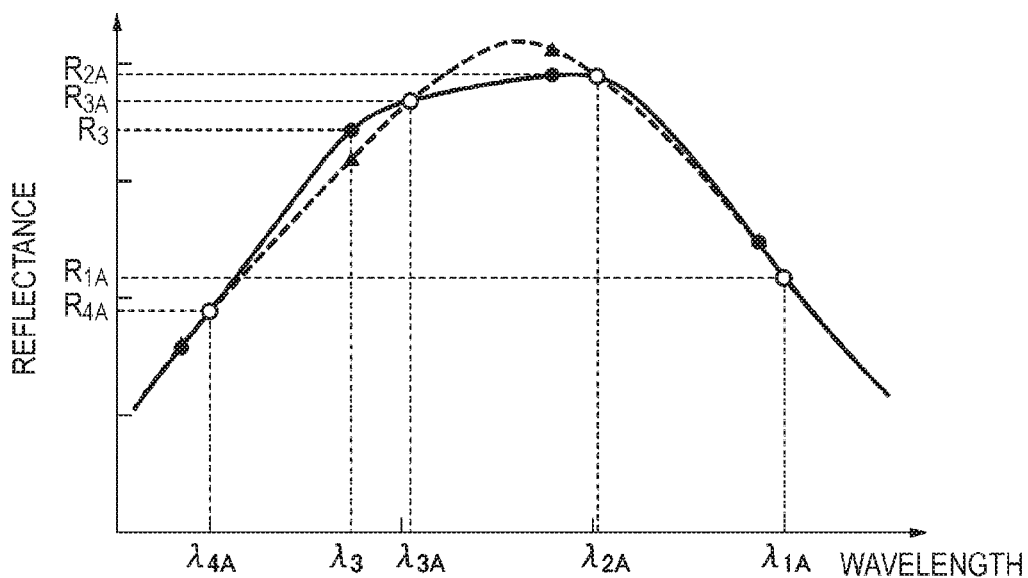
FIG. 16 is a view for describing a prediction method of reflectances for target wavelengths in a first pixel in a third embodiment.

FIG. 16 is a view for describing a prediction method of reflectances for target wavelengths in a first pixel in the third embodiment. Additionally, in FIG. 16, the broken line shows spline interpolation, and the solid line shows piecewise hermite interpolation.

In addition, in FIG. 16, the white circles are reflectances that are calculated using Step S5, and are reflectances for the subject wavelength of light that is received in the first pixel of the image sensor. The black circles are reflectances for the target wavelength that are predicted using the wavelength variation correction process in the present embodiment. In addition, the black triangles are reflectances for the target wavelength that are predicted in a case of performing the same spline interpolation as the second embodiment.

In the third embodiment, the wavelength variation correction unit 224 predicts the reflectances for the target wavelength using piecewise hermite interpolation.

In other words, as shown in FIG. 16, the wavelength variation correction unit 224 sets the reflectances $R_{1A}$, $R_{2A}$, $R_{3A}$ and $R_{4A}$ as measurement points for the subject wavelengths $\lambda_{1A}$, $\lambda_{2A}$, $\lambda_{3A}$ and $\lambda_{4A}$ of the first pixel, which are calculated in Step S5, and calculates a piecewise hermite polynomial interpolation Equation that passes through each measurement point. Further, the reflectance for the target wavelength is predicted using the calculated piecewise hermite polynomial interpolation Equation. For example, the reflectance $R_3$ is calculated for the target wavelength $\lambda_3$.

Operational Effects of Present Embodiment

In the present embodiment, since the reflectance when the light of the target wavelength is received in the first pixel is predicted using piecewise hermite interpolation, it is possible to improve the prediction accuracy of reflectance.

In a case in which the reflectances is predicted using linear interpolation such as that of the first embodiment, the reflectances are predicted for the target wavelength as points along a straight line that links respective measurement points. In this instance, the error is large in a case in which the reflectance changes in a non-linear manner between each measurement point. In particular, the error is very large in a case in which there are few measurement points. On the other hand, in a case in which spline interpolation is used, it is possible to reduce error, such as the mentioned above, but there are cases in which unintended peaks are formed between two measurement points.

In contrast to this, as a result of predicting the reflectances using piecewise hermite interpolation such as that of the present embodiment, it is possible to improve the prediction accuracy of reflectances without unintended peaks being formed between measurement points.

Fourth Embodiment

Next, a fourth embodiment according to the invention will be described on the basis of drawings.

In the first embodiment, which is mentioned above, in the spectroscopic image acquisition process, a spectroscopic image is acquired by transmitting light of the target wavelength, which corresponds to 20 nm intervals in the measurement subject wavelength region from 400 nm to 700 nm, as a single order (a primary peak wavelength) from the wavelength variable interference filter.

In contrast to this, the fourth embodiment differs from the above-mentioned first embodiment in that the order when the light is transmitted from the wavelength variable interference filter can be changed depending on the wavelength.

Figure 17:
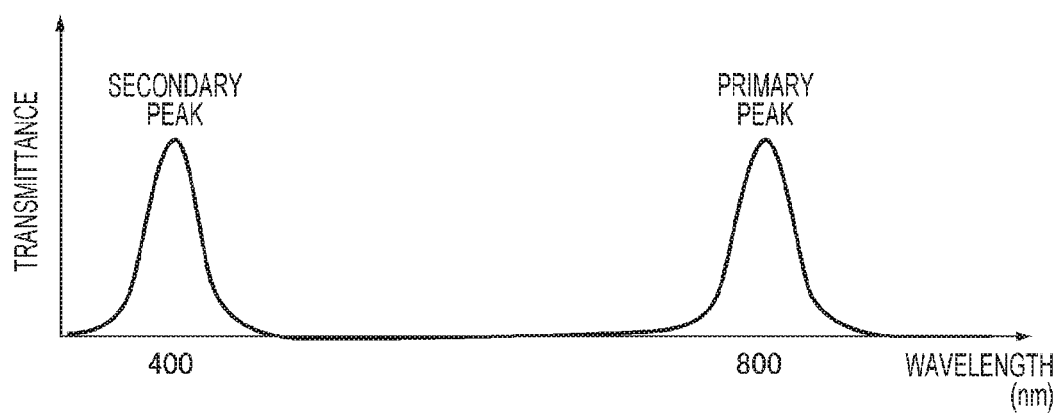
FIG. 17 is a view that schematically shows an example of spectral transmission characteristics of a wavelength variable interference filter.

FIG. 17 is a view that schematically shows an example of spectral transmission characteristics of a wavelength variable interference filter 5.

The wavelength $\lambda$ of the light that is transmitted by the wavelength variable interference filter 5, an order m, a distance d of the gap G, and a refractive index n in the gap G satisfy a relationship of the following Equation (7). Accordingly, when light is incident to the wavelength variable interference filter 5, as shown in FIG. 17, light of a plurality of wavelengths $\lambda$, which correspond to the plurality of orders m, are transmitted. Additionally, Equation (7) and FIG. 17 are theoretical values, and in a practical case, peak wavelengths fluctuate depending on a plurality of conditions.

$$\lambda = \frac{2nd}{m} \quad (7)$$

In this instance, in a case in which light of each target wavelength, which is included in the measurement subject wavelength region, is transmitted from the wavelength variable interference filter 5 with a primary peak wavelength only, the distance d of the gap G is smaller when light of a short wavelength is transmitted from the wavelength variable interference filter 5. When the distance d of the gap G is small, since the sensitivity of the electrostatic actuator 56 is high, gap control is difficult when light of a short wavelength is transmitted.

On the other hand, the light of each target wavelength being transmitted by the wavelength variable interference filter 5 as a high-order peak wavelength can also be considered, but if the distance d of the gap G is large, it becomes necessary to increase the size of the voltage that is applied to the electrostatic actuator 56 when controlling the distance d of the gap G.

Accordingly, it is preferable that the measurement subject wavelength region is divided into a plurality of partial wavelength regions, and that the light be transmitted at respectively different orders for each partial wavelength region.

In such an instance, in the second embodiment, a spectroscopic image of a target wavelength, which is included in a first partial wavelength region (400 nm to 550 nm) in the measurement subject wavelength region (400 nm to 700 nm), is acquired by light that is transmitted by the wavelength variable interference filter 5 with a secondary peak wavelength. In addition, a spectroscopic image of a target wavelength, which is included in a second partial wavelength region (550 nm to 700 nm) in the measurement subject wavelength region, is acquired by light that is transmitted by the wavelength variable interference filter 5 with a primary peak wavelength.

Figure 18:
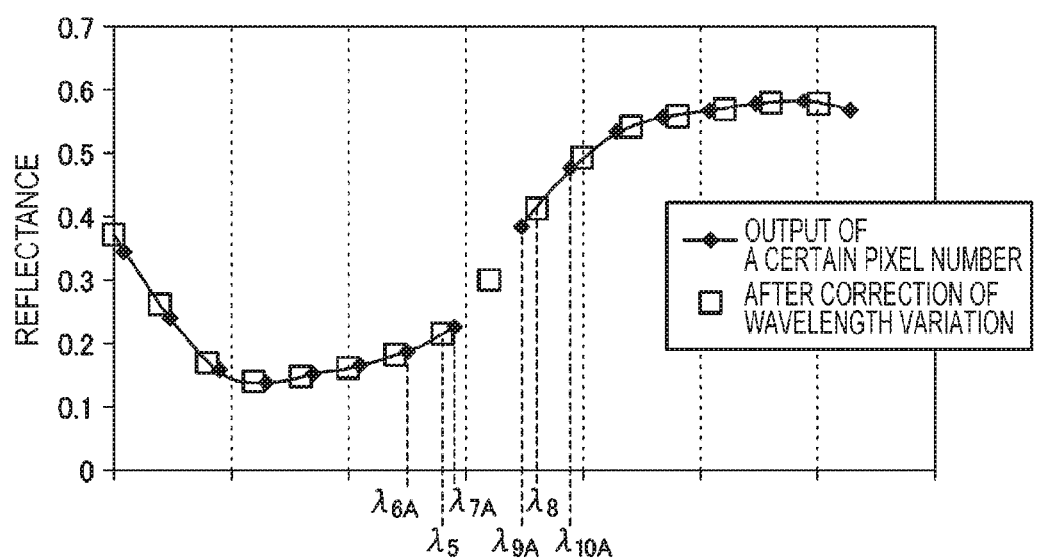
FIG. 18 is a view that shows a spectrum curve of reflectance in a predetermined pixel of a spectroscopic image in the second embodiment.

FIG. 18 is a view that shows a spectrum curve of reflectance in a predetermined pixel of a spectroscopic image in the second embodiment. An example of a spectrum curve that is shown in FIG. 18 is generated by acquiring spectroscopic images for target wavelengths in intervals of nm for a wavelength region of 400 nm to 700 nm, calculating reflectances on the basis of the gradation values of a predetermined image pixel (x, y) in each spectroscopic image, and performing polynomial approximation of the calculated reflectances. Additionally, in FIG. 18, the black square marks are reflectances that are calculated by Step S5 in FIG. 5 on the basis of gradation values of image pixels in the spectroscopic images. The white square marks are reflectances for the target wavelength that are corrected using the wavelength variation correction process of Step S6 in FIG. 5.

As shown in FIG. 18, when light of the target wavelength, which belongs to a first partial wavelength region, is transmitted by the wavelength variable interference filter 5 as a secondary peak wavelength, and light of the target wavelength, which belongs to a second partial wavelength region, is transmitted by the wavelength variable interference filter 5 as a primary peak wavelength, a spectrum curve in the first partial wavelength region and a spectrum curve in the second partial wavelength region are discontinuous.

The reason for this is that the amount of transmission light fluctuates as a result of changing the order even in a case in which the same target wavelength is transmitted by the wavelength variable interference filter 5. For example, the amount of transmission light differs between a case in which light of 500 nm is transmitted by the wavelength variable interference filter 5 as a primary peak wavelength, and a case in which light of 500 nm is transmitted by the wavelength variable interference filter 5 as a secondary peak wavelength.

Therefore, in Step S33 (FIG. 10) in the wavelength variation correction process, when predicting the reflectances when the light of the target wavelength is received in the first pixel, measurement results that are acquired with the same order that is used when transmitting light of the target wavelength from the wavelength variable interference filter 5, are used.

For example, in a case in which the reflectances are predicted for a target wavelength (a target wavelength $\lambda_5$ of FIG. 18) that is included in the first partial wavelength region, light that is transmitted by the wavelength variable interference filter 5 as a secondary peak wavelength, that is, light reception central wavelengths $\lambda_{6A}$ and $\lambda_{7A}$, which belong to the first partial wavelength region, are used.

In addition, in a case in which the reflectances are predicted for a target wavelength (a target wavelength $\lambda_8$ of FIG. 18) that is included in the second partial wavelength region, light that is transmitted by the wavelength variable interference filter 5 as a primary peak wavelength, that is, light reception central wavelengths $\lambda_{9A}$ and $\lambda_{10A}$, which belong to the second partial wavelength region, are used.

Additionally, the other configurations and processes are similar to those of the above-mentioned first to third embodiments.

Operational Effects of Present Embodiment

In the present embodiment, the order of the light reception central wavelength that is used when calculating the reflectances for the target wavelength of the first pixel is the same as the order when transmitting light of the target wavelength from the wavelength variable interference filter 5. In this case, it is possible to predict the reflectances with higher accuracy (with less error) than a case in which the reflectances of the target wavelength are predicted on the basis of light reception central wavelengths having different orders.

Modification Examples

Additionally, the invention is not limited to the above-mentioned embodiments, and modifications, improvements, and the like, are included in the invention within a range in which it is possible to achieve the object of the invention.

Modification Example 1

In the first embodiment, which is mentioned above, an example in which the wavelength shift amount Δλ is calculated by the wavelength variation calculation unit 223 using Equation (2) on the basis of the reflectance that corresponds to the reference pixel of the image sensor 13, and the reflectance that corresponds to another pixel, is shown, but the invention is not limited to this configuration.

For example, the wavelength shift amount Δλ of the reference pixel of the image sensor 13 and another pixel may be measured in advance during manufacture (during inspection) of the spectroscopic camera 1, and stored in the wavelength variation data storage region 212 of the storage section 21.

Modification Example 2

In addition, in the above-mentioned first embodiment, an example in which, as shown in FIG. 9, a reflectance curve that corresponds to the reference pixel, and a reflectance curve that corresponds to each pixel (the first pixel) are uniformly shifted by the wavelength shift amount Δλ, is shown. The reason for this is that, for example, the movable reflective film 55 is relatively inclined (including warping, strain, and the like) with respect to the fixed reflective film 54 in an initial state in which a driving voltage is not applied to the electrostatic actuator 56 of the wavelength variable interference filter 5, and the movable section 521 is displaced in a state in which the inclination is maintained when displaced to the fixed substrate 51 side.

Incidentally, there are cases in which the movable section 521 curves depending on the amount of displacement when displacing the movable section 521 of the wavelength variable interference filter 5 to the fixed substrate 51 side. In this case, the wavelength shift amount Δλ may be calculated for each reference wavelength that is caused to be incident to the reference pixel.

For example, among a plurality of items of sample data, the sample data (data that stores the reflectance of each pixel) that is calculated on the basis of a spectroscopic image that corresponds to the reference wavelength $\lambda_1$ is read. Further, the wavelength shift amount in which the F value is the smallest is calculated for each pixel, which is included in the sample data, using Equation (2), and set as a wavelength shift amount $\Delta\lambda_1$ for the reference wavelength $\lambda_1$. The same process is also performed for the other reference wavelengths, and the respective wavelength shift amounts for each pixel are calculated for each reference wavelength.

In this manner, as a result of calculating the wavelength shift amount of each pixel for the respective reference wavelengths, it is possible to calculate the reflectances that corresponds to the target wavelength of each pixel with high accuracy even in a case in which the inclination state of the movable reflective film 55 with respect to the fixed reflective film 54 changes according to the distance of the gap G, and therefore, it is possible to acquire a spectroscopic image having high accuracy.

Modification Example 3

In the first embodiment, as shown in Equation (2), the wavelength variation calculation unit 223 calculates the wavelength shift amount Δλ using a least squares technique, but the invention is not limited to this configuration. For example, the wavelength variation calculation unit 223 may use a function such as that shown in Equation (8). In this case, the wavelength shift amount Δλ may also be calculated so that the F value in Equation (8) is the smallest.

$$F(x, y, \lambda, \Delta\lambda) = \sum_i |\tilde{R}(x, y, \lambda + \Delta\lambda) - R(x, y, \lambda)|^4 \cdot \frac{dF}{d(\Delta\lambda)} = 0 \quad (8)$$

Modification Example 4

In the above-mentioned first embodiment, the wavelength variation calculation unit 223 calculates the wavelength shift amount of each pixel with the reference pixel set as the central pixel in the image sensor 13, but the invention is not limited to this configuration. For example, the reference pixel may be set as a pixel that is positioned in an end section of the image sensor 13 may be set.

In addition, in the above-mentioned first embodiment, the relationship between the wavelength of the light that is incident to the reference pixel is set as the reference wavelength, and the application voltage to the electrostatic actuator 56 of the wavelength variable interference filter 5 are recorded in the V-λ data, but reference pixel that the wavelength variation calculation unit 223 uses in the calculation of the wavelength shift amount and the reference pixel in the V-λ data may differ from one another. In other words, in the spectroscopic image acquisition processes (Steps S4, S12, S15 and S22), when calculating the wavelength shift amount Δλ using the wavelength variation calculation unit 223 by controlling the wavelength variable interference filter 5 so that the light of the reference wavelength (the target wavelength) is received in the central pixel of the image sensor 13, the wavelength shift amount Δλ may be calculated with a pixel that is positioned in an end section of the image sensor 13 set as the reference pixel. In this case, the wavelength variation correction unit 224 can calculate the light reception central wavelength of the light that is received by each pixel by adding the wavelength shift amounts that correspond to each pixel for the wavelength that is received by the pixel that is positioned in the end section of the image sensor 13, which is set as the reference pixel.

Modification Example 5

In the first embodiment, in the wavelength variation data generation process, the reflectances of the reference surfaces are known, and a plurality of items of sample data are acquired by implementing a spectroscopic measurement process for reference subject matter in which the reflectance is uniform on the reference surface, but the invention is not limited to this configuration.

For example, reference subject matter in which the reflectance on the reference surface may be known, but which does not have uniform reflectance, may also be used.

In this case, since the reflectances of the position of the reference subject matter for which an image is to be formed in each pixel of the image sensor 13, are known, the wavelength shift amount of the light that is received in each pixel may be calculated by comparing a spectroscopic spectrum based on the detection signals that are detected in each pixel, and a reflectance curve in a position that corresponds to the reference subject matter.

In addition, reference subject matter that has uniform reflectance on the reference surface, but for which the reflectance is unclear, may also be used. In this case, the wavelength variation calculation unit 223 may use the reflectance R ($x_0$, $y_0$, λ) of a reference pixel reference image pixel ($x_0$, $y_0$) as R (x, y, λ) in Equation (2) instead of using a known reflectance.

Furthermore, the sample data is acquired on the basis of a plurality of types of reference subject matter having respectively different reflectances for the reference surface, but the sample data in which reference subject matter having the same reflectance is measured a plurality of times may also be acquired.

Modification Example 6

In the above-mentioned first to fourth embodiments, a configuration that is provided with the wavelength variation correction unit 224, which corrects a spectroscopic image by predicting reflectances when the target wavelength is received by each pixel using an interpolation process, is used, but the invention is not limited to this configuration.

For example, a configuration that is provided with a driving voltage calculation unit that calculates for each pixel, an application voltage (a pixel correspondence voltage) to the electrostatic actuator 56 that is required in order to cause the target wavelength to be incident to each pixel on the basis of the wavelength shift amount $\Delta\lambda$ of the light that is received in each pixel of the image sensor 13, which is calculated by the wavelength variation calculation unit 223, may also be used.

In this case, the image acquisition unit 221 sequentially switches the driving voltage that is applied to the electrostatic actuator 56 with each pixel correspondence voltage that is calculated by the driving voltage calculation unit, and acquires a detection signal that is output from a pixel that corresponds to at that time. As a result of this, it is possible to detect a detection signal from each pixel when the light of the target wavelength is received, and therefore, it is possible to acquire a spectroscopic image for the target wavelength by synthesizing the detection signals.

Modification Example 7

In each of the above-mentioned embodiments and modification examples, reflectance is illustrated as the optical association value of the invention by way of example, but the invention is not limited to this configuration.

That is, in the above-mentioned embodiments, reflectance is calculated from the gradation value of each image pixel in each spectroscopic image in order to suppress the influences of illumination variations in the illumination light from the light source section 11 and shading due to a lens such as the incidence optical system 12 by correcting the gradation values of the spectroscopic images using reference white data and dark data. In contrast to this, for example, in a case in which uniform illumination light, in which there is no illumination variation, is radiated from the light source section 11, or the like, the wavelength shift amount $\Delta\lambda$ may be calculated on the basis of the gradation value of each image pixel (x, y) in each spectroscopic image.

In addition, the wavelength variation correction unit 224 may predict the intensity (the gradation value at an image pixel (x, y)) of the light of a case in which light of the target wavelength is received by a pixel of the image sensor 13 that corresponds to the image pixel (x, y) on the basis of a gradation value of the image pixel (x, y) of the spectroscopic image, and a light reception central wavelength of the light that is received by the image sensor 13, which corresponds to the corresponding image pixel.

In this manner, it is possible to use various values based on the detection signal that is output from each pixel of the image sensor 13 as the optical association value. In addition to the reflectance, which is described in each of the embodiments, examples of this kind of optical association value include the intensity (the detection signal) of the light that is received by each pixel, the gradation values of each image pixel in a spectroscopic image that corresponds to each pixel, the absorbance that is calculated on the basis of the gradation value, and the like.

Modification Example 8

In the prediction process of reflectance in Step S33, linear interpolation is illustrated by way of example in the first embodiment, spline interpolation is illustrated by way of example in the second embodiment, and piecewise hermite interpolation is illustrated by way of example in the third embodiment, but the invention is not limited to such configurations. For example, another method such as Lagrange interpolation, or tri-linear interpolation may also be used.

In addition, a configuration in which the interpolation method is changed depending on the measurement subject, the measurement objective, or the like, may also be used. For example, the linear interpolation in the first embodiment can be used in a case of achieving further increases in the speed of arithmetic processing. The spline interpolation that is shown in the second embodiment can be used on a measurement subject (a measurement subject having sharp peak wavelengths, or the like) in which changes in reflectance are large with respect to wavelength since there is a possibility that there will be peak wavelengths between two measurement points. Furthermore, piecewise hermite interpolation such as that of the third embodiment can be used for a measurement subject (a measurement subject having a broad spectroscopic spectrum, or the like) in which changes in reflectance are small with respect to wavelength.

Modification Example 9

In the fourth embodiment, an example in which the subject wavelength to be transmitted and the reflectance that corresponds to the subject wavelength are used at the same order as the order when transmitting light of the target wavelength using the wavelength variable interference filter 5 when predicting the reflectance that corresponds to the target wavelength, is shown, but the invention is not limited to this configuration.

For example, when predicting the reflectance for the target wavelength $\lambda_5$ that is included in the first partial wavelength region, light that is transmitted by the wavelength variable interference filter 5 as the primary peak wavelength, that is, light reception central wavelengths $\lambda_{9A}$ and $\lambda_{10A}$, which belong to the second partial wavelength region, may also be used. However, in this case, it is necessary to use an extrapolation technique in the prediction of the reflectance of the target wavelength $\lambda_5$, and the prediction accuracy (the probability) of the reflectances is reduced. In addition, the reflectance for the target wavelength $\lambda_5$ that is received by the reference pixel is calculated on the basis of the light that is transmitted by the wavelength variable interference filter 5 as the secondary peak wavelength. Accordingly, if the predicted reflectance is used it without change when correcting a spectroscopic image, since the accuracy of the spectroscopic image is reduced, it is necessary to further perform a correction process using the difference in the order in order, and therefore, the processing load relating to correction of the spectroscopic image is increased, and the processing time is also increased.

For the reasons mentioned above, as shown in the fourth embodiment, in a case in which a plurality of orders are used in the spectroscopic image acquisition process, it is preferable to predict the reflectance that corresponds to the target wavelength using the subject wavelength having the same order as the target wavelength, and the reflectance that corresponds to the corresponding subject wavelength.

Modification Example 10

In each of the above-mentioned embodiments, a reference value was measured from a measurement result of the white reference calibration object, but a value that is set in advance may also be used as the reference value. The same applies to dark values, and a value that is set in advance may be used. In addition, dark values may be set to "0".

Modification Example 11

In each of the above-mentioned embodiments, an example in which a wavelength variable interference filter, which is a Fabry-Perot etalon element, is used as the spectroscopic element of the invention, is shown, but the invention is not limited to this configuration. For example, a liquid crystal tunable filter, or the like, may also be used as the spectroscopic element of the invention.

Modification Example 12

In the above-mentioned first embodiment, a spectroscopic camera is illustrated as the electronic apparatus of the invention by way of example, but the invention is not limited to this configuration.

For example, the invention may also be applied to a printing apparatus that prints an image on subject matter. In this case, the measurement device (the spectroscopic camera 1) of the invention is incorporated in a printing head that forms an image on subject matter. In this case, after printing is implemented on subject matter by a printing section in which the printing head is provided, it is possible to acquire a spectroscopic image of the printed image using the spectroscopic camera 1.

In addition, the specific structures when implementing the invention may be altered as appropriate to other structures, or the like, within a range in which it is possible to achieve the objective of the invention.

The entire disclosure of Japanese Patent Application No. 2015-212281, filed Oct. 28, 2015 is expressly incorporated by reference herein.

What is claimed is:

1. A measurement device comprising:
a spectroscopic element that disperses light of a predetermined wavelength among incidence light, and that is capable of changing a wavelength of the light that is dispersed; and
an image capturing element that receives light that is dispersed by the spectroscopic element, and includes a plurality of pixels,
wherein a wavelength shift amount, which is a difference between a reference wavelength that is a central wavelength of light that is incident to a predetermined reference pixel, and a central wavelength of light that is incident to one of the plurality of pixels, is calculated on the basis of each image capture result when images of a plurality of reference subjects are captured using the spectroscopic element and the image capturing element.

2. The measurement device according to claim 1, wherein the reference subjects have known reflectances.

3. The measurement device according to claim 1, wherein the wavelength shift amount is calculated on the basis of each image capture result when the images of a plurality of reference subjects having different reflectances, are captured.

4. The measurement device according to claim 1, wherein the wavelength shift amount is calculated using a least squares technique.

5. The measurement device according to claim 1, further comprising:
a correction unit that corrects a spectroscopic image on the basis of the respective wavelength shift amounts in the plurality of pixels when the spectroscopic image of the first wavelength, which is dispersed by the spectroscopic element is captured by the image capturing element by causing measurement light to be incident to the spectroscopic element.

6. The measurement device according to claim 1, wherein the spectroscopic element is a Fabry-Perot etalon element.

7. An electronic apparatus comprising:
the measurement device according to claim 1.

8. A measurement method of a measurement device including
a spectroscopic element that disperses light of a predetermined wavelength among incidence light, and that is capable of changing a wavelength of light that is dispersed, and
an image capturing element that receives light that is dispersed by the spectroscopic element, and includes a plurality of pixels,
the method comprising:
capturing images of a plurality reference subjects using the spectroscopic element and the image capturing element; and
calculating respective wavelength shift amounts between a reference pixel and each of the plurality of pixels from differences between a reference wavelength, which is a central wavelength of light that is incident to the reference pixel, and a plurality of wavelengths of light that is incident to each of the plurality of pixels, on the basis of each image capture result for the plurality of reference subjects.

* * * * *